United States Patent
Zhang et al.

(10) Patent No.: US 9,013,551 B2
(45) Date of Patent: Apr. 21, 2015

(54) METHODS AND SYSTEMS FOR PRESENTING THREE-DIMENSIONAL MOTION PICTURES WITH CONTENT ADAPTIVE INFORMATION

(75) Inventors: Ning Zhang, Oakville (CA); Samuel Zhou, Mississauga (CA); Jingqin Zhou, Mississauga (CA); Todor Beric, Grimsby (CA)

(73) Assignee: IMAX Corporation, Mississauga, ON ( * ) Notice: Subject to any disclaimer, the term of this patent is extended or adjusted under 35 U.S.C. 154(b) by 170 days.

(21) Appl. No.: 13/125,317

(22) PCT Filed: Dec. 1, 2009

(86) PCT No.: PCT/IB2009/007614
§ 371 (c)(1),
(2), (4) Date: Apr. 21, 2011

(87) PCT Pub. No.: WO2010/064118
PCT Pub. Date: Jun. 10, 2010

(65) Prior Publication Data
US 2011/0242104 A1    Oct. 6, 2011

Related U.S. Application Data

(60) Provisional application No. 61/200,725, filed on Dec. 1, 2008.

(51) Int. Cl.
*H04N 13/02*    (2006.01)
*H04N 13/00*    (2006.01)

(52) U.S. Cl.
CPC ......... *H04N 13/007* (2013.01); *H04N 13/0003* (2013.01); *H04N 13/004* (2013.01)

(58) Field of Classification Search
CPC .............. H04N 13/007; H04N 13/004; H04N 13/0018; H04N 2013/0081; H04N 13/0239; H04N 13/0055; H04N 13/0296; H04N 13/0497; H04N 13/0242
USPC .............................................. 348/46; 382/154
See application file for complete search history.

(56) References Cited

U.S. PATENT DOCUMENTS 5,175,616 A    12/1992    Milgram et al.
5,793,470 A    8/1998     Haseltine et al.
(Continued)

FOREIGN PATENT DOCUMENTS

CA    2268373    10/1999
EP    1796298    6/2007
(Continued)

OTHER PUBLICATIONS

International Application No. PCT/IB2009/007614, International Preliminary Report on Patentability mailed on Jun. 16, 2011, 12 Pages.
(Continued)

*Primary Examiner* — Andy Rao
*Assistant Examiner* — Jared Walker
(74) *Attorney, Agent, or Firm* — Kilpatrick Townsend & Stockton LLP

(57) ABSTRACT

The present invention relates generally to methods and systems for the production of 3D motion picture subtitles adapted to image content for improved viewer experience. Some embodiments of the present invention relate to positioning subtitles at variable, scene-dependent depth. Certain aspects of the present invention may be applicable to general 3D display applications and/or digital projection of 3D motion pictures.

34 Claims, 20 Drawing Sheets

(56) References Cited

U.S. PATENT DOCUMENTS

| | | | |
|---|---|---|---|
| 6,160,909 | A | 12/2000 | Melen |
| 6,466,208 | B1 | 10/2002 | Yet et al. |
| 6,545,803 | B1 | 4/2003 | Sakuma et al. |
| 6,678,588 | B2 | 1/2004 | He |
| 6,819,395 | B2 | 11/2004 | Werner |
| 7,139,002 | B2 | 11/2006 | Estrop |
| 2002/0178278 | A1 | 11/2002 | Ducharme |
| 2003/0195672 | A1 | 10/2003 | He |
| 2004/0041981 | A1 | 3/2004 | Werner |
| 2004/0085260 | A1 | 5/2004 | McDavid, III |
| 2005/0088619 | A1 | 4/2005 | Werner |
| 2005/0147309 | A1* | 7/2005 | Katata et al. ............... 382/239 |
| 2005/0270286 | A1* | 12/2005 | Hirvonen et al. ............ 345/422 |
| 2005/0286756 | A1* | 12/2005 | Hong et al. ................... 382/154 |
| 2005/0286759 | A1* | 12/2005 | Zitnick et al. ................ 382/154 |
| 2006/0274156 | A1* | 12/2006 | Rabbani et al. .......... 348/208.99 |
| 2007/0130605 | A1 | 6/2007 | Chung |
| 2007/0267567 | A1 | 11/2007 | Filipovich et al. |
| 2007/0288844 | A1* | 12/2007 | Zingher et al. ................ 715/529 |
| 2008/0062256 | A1* | 3/2008 | Yamauchi et al. ............. 348/46 |
| 2008/0118143 | A1* | 5/2008 | Gordon et al. ............... 382/154 |
| 2008/0240549 | A1* | 10/2008 | Koo et al. .................... 382/154 |
| 2009/0195643 | A1* | 8/2009 | Neuman ......................... 348/51 |

FOREIGN PATENT DOCUMENTS

| | | | |
|---|---|---|---|
| EP | 1798728 | 6/2007 | |
| EP | 1857854 | 11/2007 | |
| JP | S63167594 | 7/1988 | |
| JP | 06119653 | 4/1994 | |
| JP | 2001326948 | 11/2001 | |
| JP | 2004274125 | 9/2004 | |
| JP | 2006325165 | 11/2006 | |
| JP | 2007193091 | 8/2007 | |
| JP | 2008115222 | 5/2008 | |
| JP | 2008236257 | 10/2008 | |
| RU | 2006101818 | 8/2007 | |
| RU | 2007110904 | 10/2008 | |
| WO | 9938098 | 7/1999 | |
| WO | 03087727 | 10/2003 | |
| WO | 2004044844 | 5/2004 | |
| WO | 2004071102 | 8/2004 | |
| WO | 2007006762 | 1/2007 | |
| WO | 2008044191 | 4/2008 | |
| WO | WO-2008115222 | 9/2008 | |
| WO | WO 2008115222 A1 * | 9/2008 | ............ H04N 13/00 |
| WO | WO-2010064118 | 6/2010 | |

OTHER PUBLICATIONS

PCT Application No. PCT/IB2009/007614, International Search Report and Written Opinion dated Mar. 22, 2010.

Atzpadin, N. et al., "Stereo Analysis by Hybrid Recursive Matching for Real-Time Immersive Video Conferencing", IEEE Transactions on Circuits and Systems for Video Technology, IEEE Service Center, Piscataway, NJ, US, vol. 14, No. 3, ISSN: 1051-8215, pp. 323-327 (Mar. 1, 2004).

Baker, H. H. et al., "Generalizing epipolar-plane image analysis on the spatiotemporal surface", Proceedings of the Conference on Computer Vision and Pattern Recognition, Ann Arbor, Jun. 5-9, 1988, vol. 5, Jun. 1988, pp. 2-9.

Criminisi, A. et al., "Extracting layers and analyzing their specular properties using epipolar-plane-image analysis", Computer Vision and Image Understanding, Academic Press, US, vol. 97, No. 1, pp. 51-85, ISSN: 1077-3142 (Jan. 1, 2005).

Chinese Patent Application No. 200980148390.4, Office Action, mailed on May 9, 2013, 13 pages.

European Patent Application No. 09797151.9, Response to Rule 161(1) and 162 EPC Communication, mailed on Jan. 13, 2012, 64 pages.

European Patent Application No. 09797151.9, Rule 161(1) and 162 EPC Communication, mailed on Jul. 13, 2001, 2 pages.

Arsenin, "Method of image construction in the subtitle generation systems", Avtometriya, 97-45 EIX97453819530 NDN-017-0282-6814-6 EIX Elsevier, No. 2, 1997, pp. 75-82.

Bauchkar, "Augmented reality interaction model for mobile infrastructure management systems", Proceedings—33rd CSCE Annual Conference 2005: 1st Specialty Conference on Infrastructure Technologies, Management and Policies, 2005, pp. FR-129-1 to FR-129-10.

Japanese Patent Application No. 2011-538072, Office Action, mailed Aug. 13, 2013, 5 pages.

Kovacevic, "A cost effective architecture for HDTV with 2D/3D graphics", 2000 Digest of Technical Papers. International Conference on Consumer Electronics. Nineteenth in the Series, 2000, pp. 380-381.

Kovacevic, "Design considerations for ISO/IEC 13818-1 decoders", ICCE. International Conference on Consumer Electronics, 2001, pp. 92-93.

Perry, "The media event—virtual reality", IEEE Spectrum, vol. 31, No. 1, 1994, p. 21.

Redert, "Visualization of arbitrary-shaped 3D scenes on depth-limited 3D displays", Proceedings of the 2nd International Symposium on 3D Data Processing, Visualization and Transmission, 2004, pp. 938-942.

Sarnoff Corporation, "PyramidVision Unveils TerraSight (TM) Software That Turns Real-Time Surveillance into Actionable Intelligence", Business Wire, BWIR20050912005778 NDN-205-0082-1056-4 NWS ProQuest, Sep. 12, 2005, 2 pages.

Tripp, III, "A real time three-dimensional color animation system : 10.1145/988613.988614", ACM SIGGRAPH Computer Graphics., Edition—Winter 1975, vol. 9, No. 4, 1975, pp. 6-8.

Yeh et al., "Effects of Frame of Reference and Viewing Condition on Attentional Issues with Helmet Mounted Displays", U.S. Army Research Laboratory Interactive Displays Federated Laboratory Aberdeen Proving Ground, MD, Technical Report No. ARL-98-1/ARMY-FED-LAB-98-1, Jan. 1998, 76 pages.

Chinese Patent Application No. 200980148390.4, Office Action, mailed Oct. 12, 2013, 15 pages.

Japanese Patent Application No. 2011-538072, "Office Action", mailed Jan. 7, 2014, 13 pages.

Russian Patent Application No. 2011126983, "Office Action", mailed Nov. 15, 2013, 9 pages.

Chinese Patent Application No. 200950148390.4, Office Action issued on May 5, 2014, 6 pages.

Russian Application No. 2011126983, Office Action mailed on Nov. 25, 2014, 24 pages (containing 11 pages of the English translation and 13 pages of the original document).

* cited by examiner

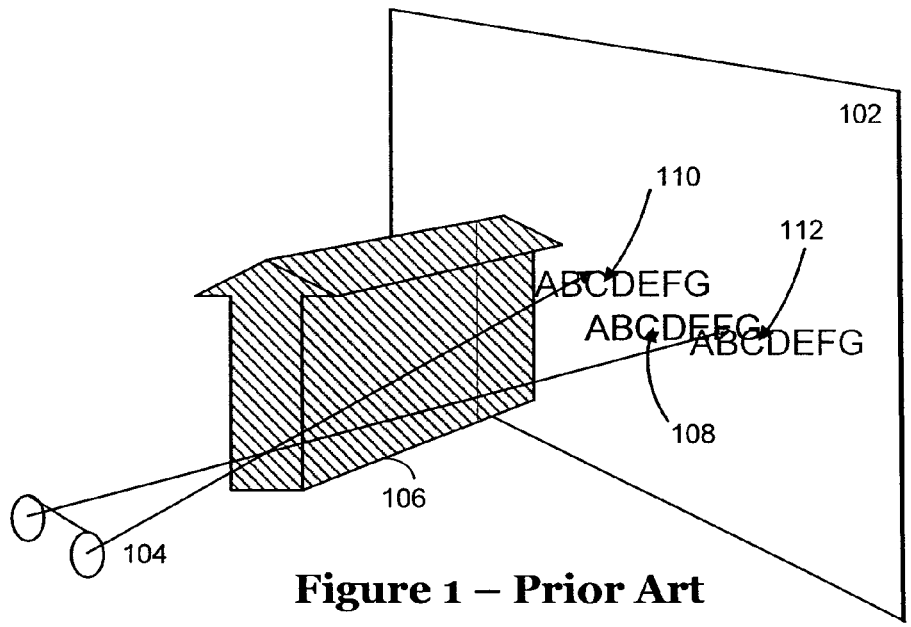
Figure 1 – Prior Art
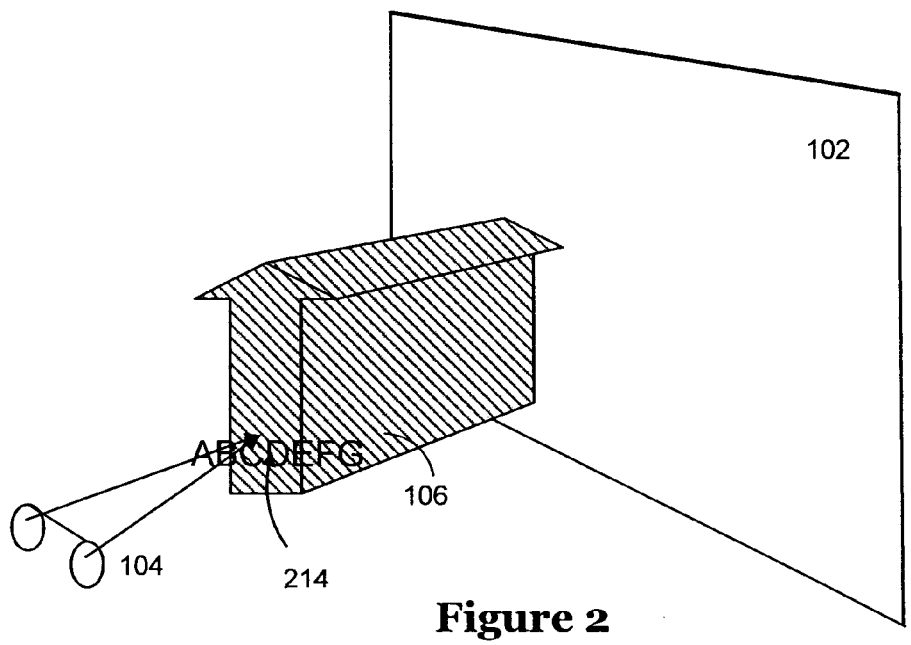
Figure 2

```
<Subtitle SpotNumber="21" TimeIn="00:01:58:062" TimeOut="00:02:01:219"
<Text Halign="center" Hposition="0" Valign="bottom" Vposition="200">
This text is
monoscopic </Text >
<Font Italic="yes">
<Text Halign="center" Hposition="0" Valign="bottom" Vposition="140" >
This text is
italic and monoscopic </Text >
</Font>
</Subtitle>
```

Figure 14A

```
<Subtitle SpotNumber="21" TimeIn="00:01:58:062" TimeOut="00:02:01:219"
<FontID="Arial" Color="FFFFFFFF" Weight="normal" Size="50">
Text Halign="center" Hposition="0" Valign="bottom" Vposition="200"
Pshift="15">
This text is
sterepscopic </Text >
<Font Italic="yes">
<Text Halign="center" Hposition="0" Valign="bottom" Vposition="140"
Pshift="15">
This text is
italic and stereoscopic </Text >
</Font>
</Subtitle>
```

Figure 14B

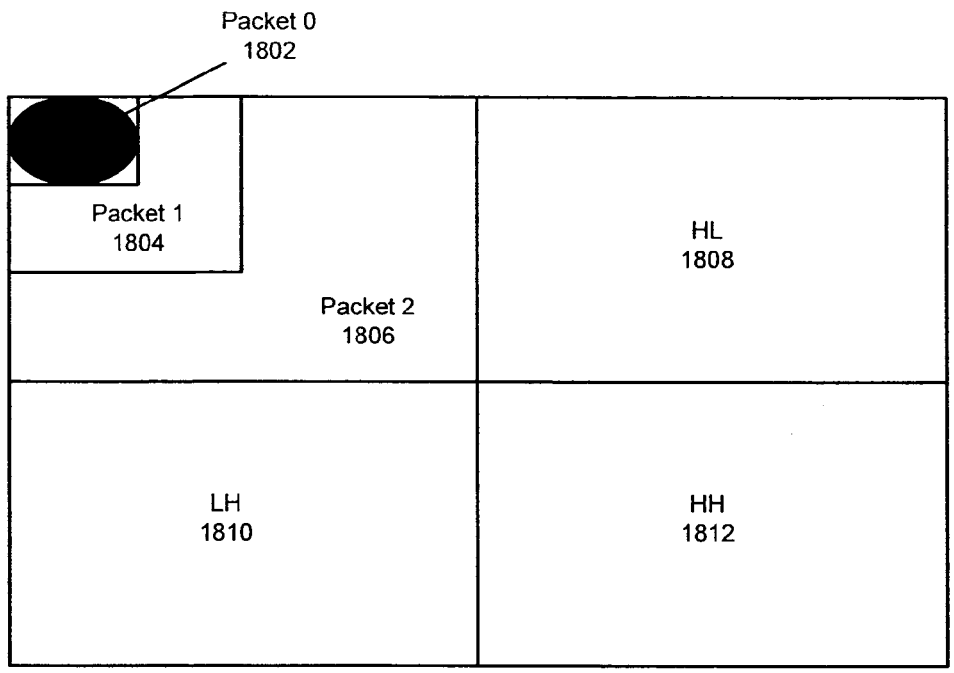
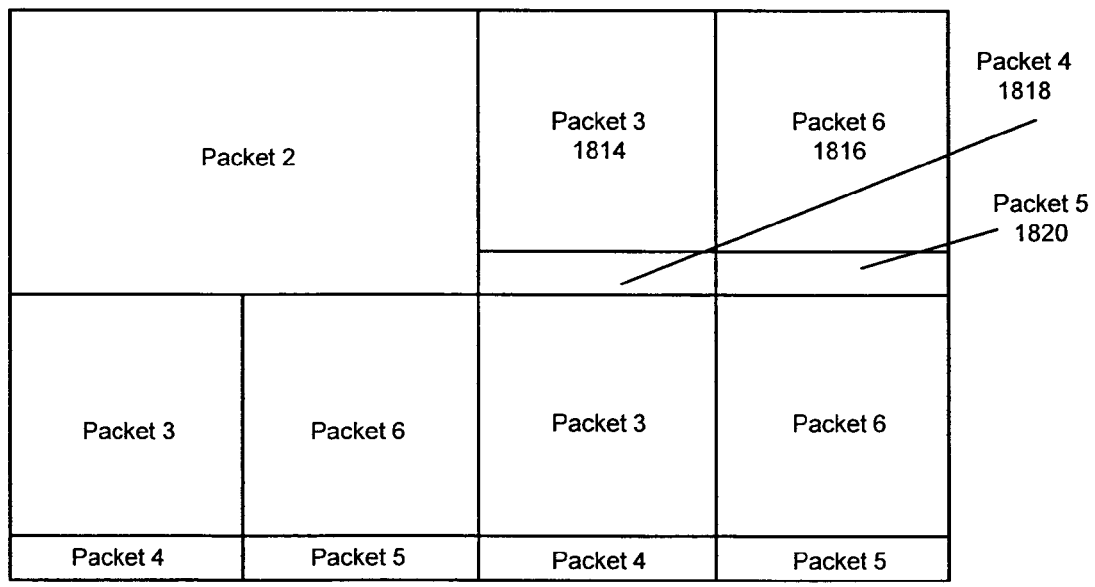
Figure 18

METHODS AND SYSTEMS FOR PRESENTING THREE-DIMENSIONAL MOTION PICTURES WITH CONTENT ADAPTIVE INFORMATION

CROSS-REFERENCE TO RELATED APPLICATIONS

This application is a U.S. national phase patent application under 35 U.S.C. 371 of International Patent Application No. PCT/IB2009/007614 titled "Methods and Systems for Presenting Three-Dimensional Motion Pictures with Content Adaptive Information" and filed Dec. 1, 2009, which claims benefit of priority under PCT Article 8 of U.S. Provisional Application No. 61/200,725, titled "Methods and Systems for Presenting Three-Dimensional Motion Pictures with Content Adaptive Three-Dimensional Subtitles" filed on Dec. 1, 2008. Both applications are incorporated herein by reference in their entireties.

FIELD OF THE DISCLOSURE

This disclosure relates generally to three-dimensional image processing and, more particularly, to processing images to display additional information, such as subtitles, with a three-dimensional (3D) image based on content of the 3D image.

BACKGROUND

Subtitles are textual representations of aural dialog that has been translated into a language that is typically different from the original version in a motion picture presentation. Subtitles may be captions that can be used to describe both the aural dialogue and sound descriptions to aid hearing-impaired presentation viewers. Caption text may be displayed on the screen or displayed separately. The term "subtitle" refers to any text or graphic displayed on the picture presentation screen. A subtitle is a type of "additional information" that may be displayed in addition to the picture. Subtitles are displayed on a screen, usually at the bottom of the screen, to help the audience follow the dialog in the movie, such as dialog spoken in a language the audience may not understand or to assist audience members who have difficulty hearing sounds.

Typically, subtitles are received as a subtitle file that contains subtitle elements for a motion picture. A subtitle element can include subtitle text and timing information indicating when the subtitle text should appear and disappear on the screen. Often, the timing information is based on a time code or other equivalent information such as film length (e.g. measured in feet and frames). A subtitle file can also include other attributes such as text fonts, text color, subtitle screen positioning and screen alignment information, which describe how subtitles should appear on the screen. A conventional subtitle display system interprets the information from a subtitle file, converts subtitle elements to a graphical representation and displays the subtitles on a screen in synchronization with images and in accordance with the information in the subtitle file. The function of a conventional subtitle display system can be performed by a digital cinema server that superimposes the converted subtitle representation onto images to be displayed by a digital projector.

The presentation of a three-dimensional (3D) motion picture is performed by displaying stereoscopic 3D images in sequence using a stereoscopic 3D display system. A 3D image includes a left-eye image and a corresponding right-eye image, representing two slightly different views of the same scene similar to the two perspectives as perceived by both eyes of a human viewer. The differences between the left-eye and the right-eye images are referred to as binocular disparity, which is often used interchangeably with "disparity". Disparity can refer to the horizontal position difference between a pixel in a left-eye image and the corresponding pixel in a corresponding right-eye image. Disparity may be measured by the number of pixels. A similar concept is "parallax" which refers to the horizontal position distance between such a pair of pixels when displayed on the screen. Parallax may be measured by a distance measure, such as in inches. The value of parallax can be related to the value of pixel disparity in the 3D image data by considering the dimension of the display screen. A 3D motion picture includes multiple left-eye image sequences and corresponding right-eye image sequences. A 3D display system can ensure that a left-eye image sequence is presented to the left eye of a viewer and a right-eye image sequence is presented to the right eye of the viewer, producing the perception of depth. The perceived depth of a pixel in a 3D image frame can be determined by the amount of parallax between the displayed left-eye and right-eye views of the corresponding pixel pair. A 3D image with a strong parallax, or with larger pixel disparity values, appears closer to the human viewer.

One method of providing subtitles, or any additional information, for a 3D motion picture includes using a conventional subtitle display system in which a monoscopic version of subtitle images is displayed on a screen for both the left and right eyes to see, effectively placing the subtitles at the depth of the screen. When 3D images with a strong parallax are presented with a monoscopic version of subtitles, an audience may have difficulty reading the subtitles that appear behind the depth of the images because the eyes of audience members are unable to fuse the images at one depth and the subtitles at a different depth simultaneously.

A subtitle displayed conventionally with a 3D image is depicted in FIG. 1. The 3D image is displayed that includes a main object 106 that has an apparent depth of coming out of the screen 102. The monoscopic subtitle text 108 has an apparent depth of at the screen. When a viewer wearing 3D glasses 104 focuses on the main object 106, the viewer may perceive the subtitle 108 behind the main object 106 may be perceived as double images 110 and 112. Viewers may experience difficulty in reading the subtitle text while watching the 3D images. This problem is particularly unpleasant for an audience in a large-screen 3D cinema venue, such as an IMAX® 3D theater, where 3D images are presented with a stronger parallax and appear more immersive and closer to the audience than that in a smaller 3D theater.

Although this problem is presented for subtitles, any information in addition to the 3D image to be displayed with the 3D image can experience this and other problems discussed herein.

Another method of projecting subtitles for a 3D motion picture with a conventional subtitle display system is to place the monoscopic version of subtitles near the top of a screen. Such a method reduces audience-viewing discomfort since, in most 3D scenes, image content near the top of image frames often have more distant depth values than image content near the bottom of the image frames. For example, image content near the top of an image often includes sky, clouds, the roof of a building or hills that appear far away from the other objects in a scene. These types of content often have a depth close to or behind the screen depth. A viewer may find it easier to read the monoscopic version of subtitles while nearby image content are far away or even behind the screen depth. However, viewers may continue to experience difficulty when image content near the top of a screen has an apparent depth that is close to the further. Furthermore, viewers may find it inconvenient to focus on the top of an image continually to receive subtitle or other additional information to the image.

Accordingly, systems and methods are desirable that can cause subtitles or other additional information to be displayed at an acceptable depth or other location on the display and with a 3D image.

Furthermore, although some existing methods can be used to determine the depth of 3D image content, such existing methods are inapplicable to determining the depth of 3D image content quickly and dynamically. A conventional stereo-matching method is unable to deliver accurate disparity results consistently because it fails to account for temporally changing image content. As a result, the depth of 3D subtitles computed based on a conventional stereo matching method may not be temporally consistent and, thus, may result in viewing discomfort by the audience. Furthermore, a conventional stereo matching method may not be efficient and sufficiently reliable for automated and real-time computing applications. Accordingly, systems and methods are also desirable that can be used to determine a depth of 3D image content quickly and dynamically so that the depth can be used to locate subtitle or other information in addition to the 3D image content.

SUMMARY

Certain embodiments relate to processing and displaying subtitles in stereoscopic three-dimensional (3D) in a 3D motion picture presentation to enable an audience to read the images and subtitles with ease and comfort. The stereoscopic 3D subtitles, or 3D subtitles, can be created by displaying a left-eye subtitle image and a right-eye subtitle image with a proper disparity or parallax.

In one embodiment, 3D subtitles are processed that have a content adaptive depth based on 3D images with high levels of computing efficiency and computing reliability.

In one embodiment, 3D subtitles are processed that have a content adaptive depth with high levels of computing efficiency and computing reliability, based on a compressed version of 3D images available in a form of digital cinema package (DCP).

In one embodiment, 3D subtitles that have a content adaptive depth are processed and displayed, while maintaining a consistent perceived subtitle font size.

In one embodiment, a 3D digital projection system is provided for computing and displaying 3D subtitles with content adaptive depth.

In one embodiment, 3D subtitles with a content adaptive depth, as well as other content adaptive subtitle attributes including font style, font size, color or luminance and screen position, are processing and displayed.

In one embodiment, a 3D digital projection system is provided for computing and displaying 3D subtitles with content adaptive depth as well as other content adaptive subtitle attributes including font style, font size, color or luminance and screen position.

In an embodiment, a 3D image sequence and a subtitle file for the 3D image sequence are received. The subtitle file includes a subtitle element and timing information associated with the subtitle element. The subtitle element is associated with a segment of the 3D image sequence based on timing information. An abstract depth map is computed from the segment associated with the subtitle element. A proxy depth is computed based on the abstract depth map for the subtitle element. The proxy depth is used to determine a render attribute for the subtitle element. The render attribute is outputted.

In an embodiment, a display medium is provided for displaying images on the display medium. The display medium includes a 3D image sequence that has content at variable apparent depths. The display medium also includes a subtitle element that has an apparent depth that changes based on the variable apparent depths of the content of the 3D image sequence.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTIONS OF THE DRAWINGS

FIG. 1 illustrates a prior art representation of a three-dimensional (3D) image with monoscopic subtitles displayed on a screen.

FIG. 2 illustrates a representation of a a 3D image with stereoscopic subtitles displayed on a screen according to one embodiment of the present invention.

Figure 5:
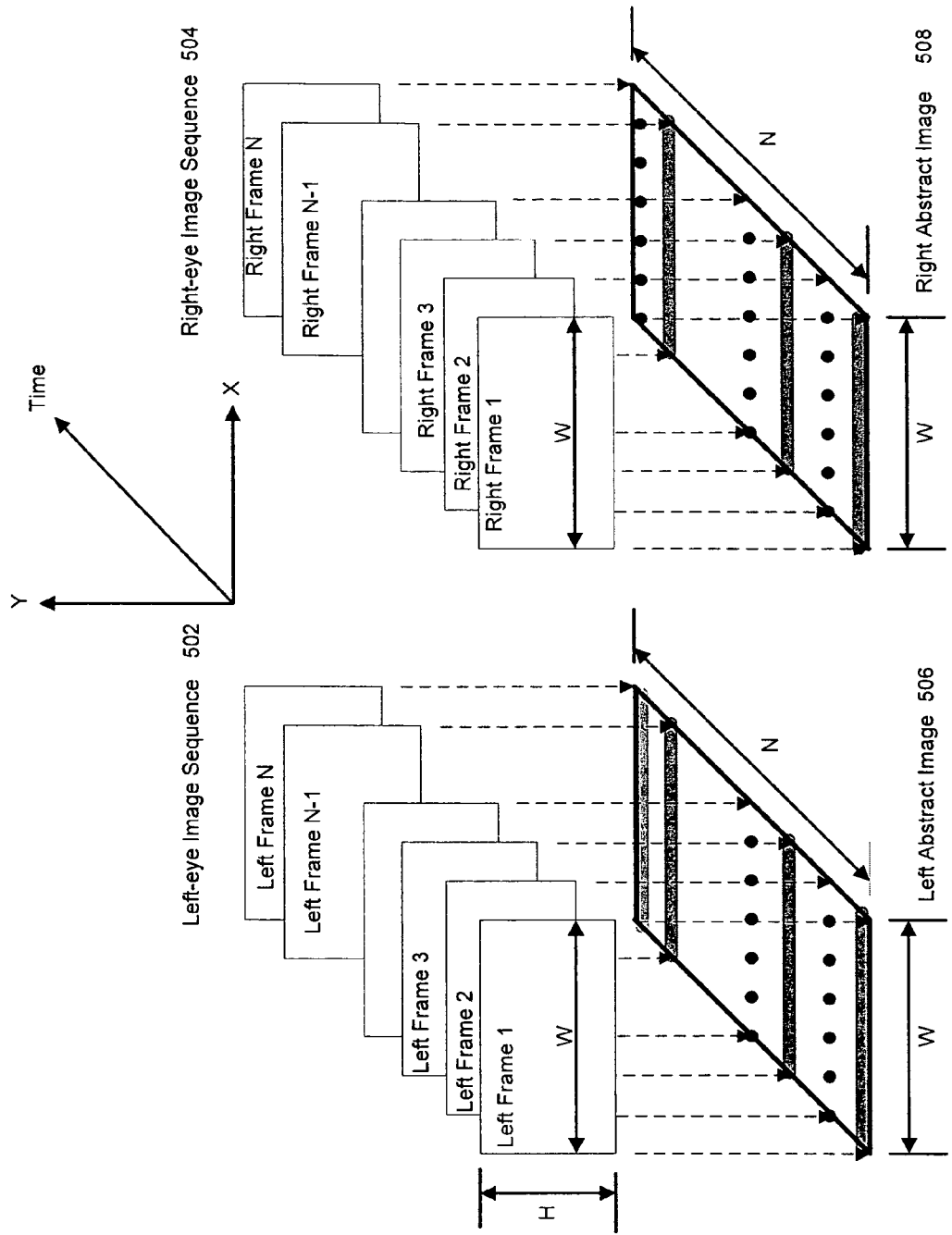

FIG. 5 graphically illustrates image abstraction according to one embodiment of the present invention.

Figure 6:
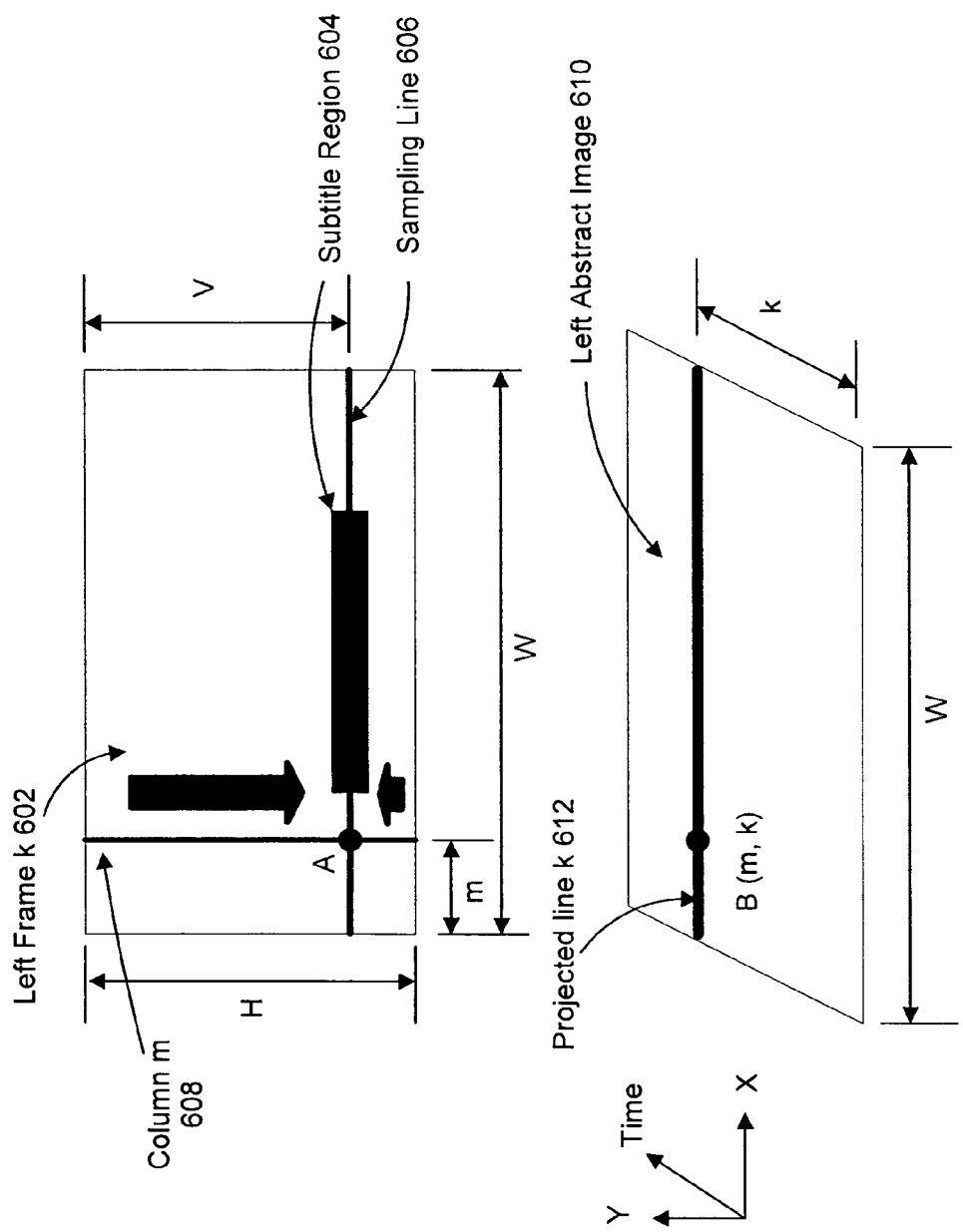

FIG. 6 graphically illustrates vertical sampling projection according to one embodiment of the present invention.

Figure 7:
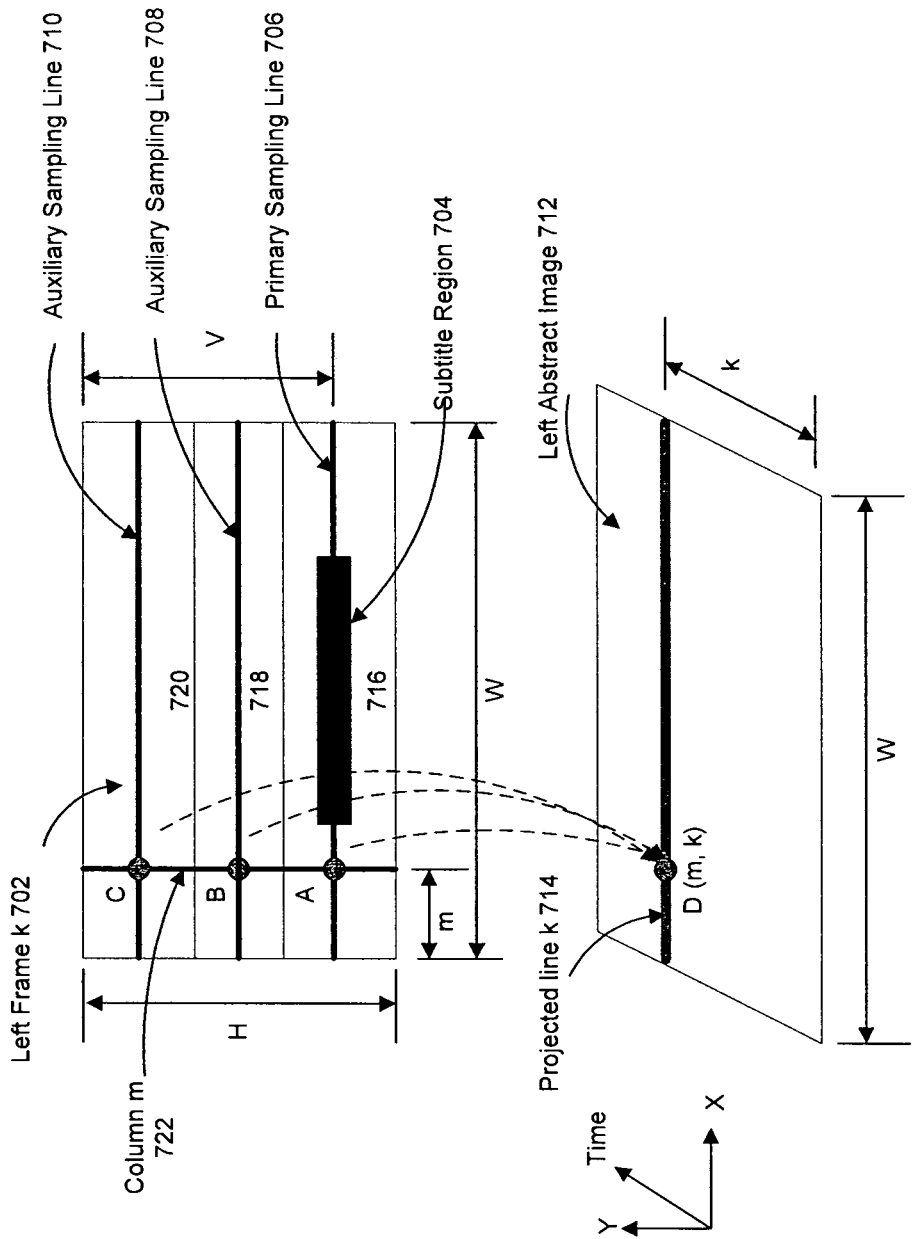

FIG. 7 graphically illustrates multiple vertical sampling projection according to one embodiment of the present invention.

Figure 8:
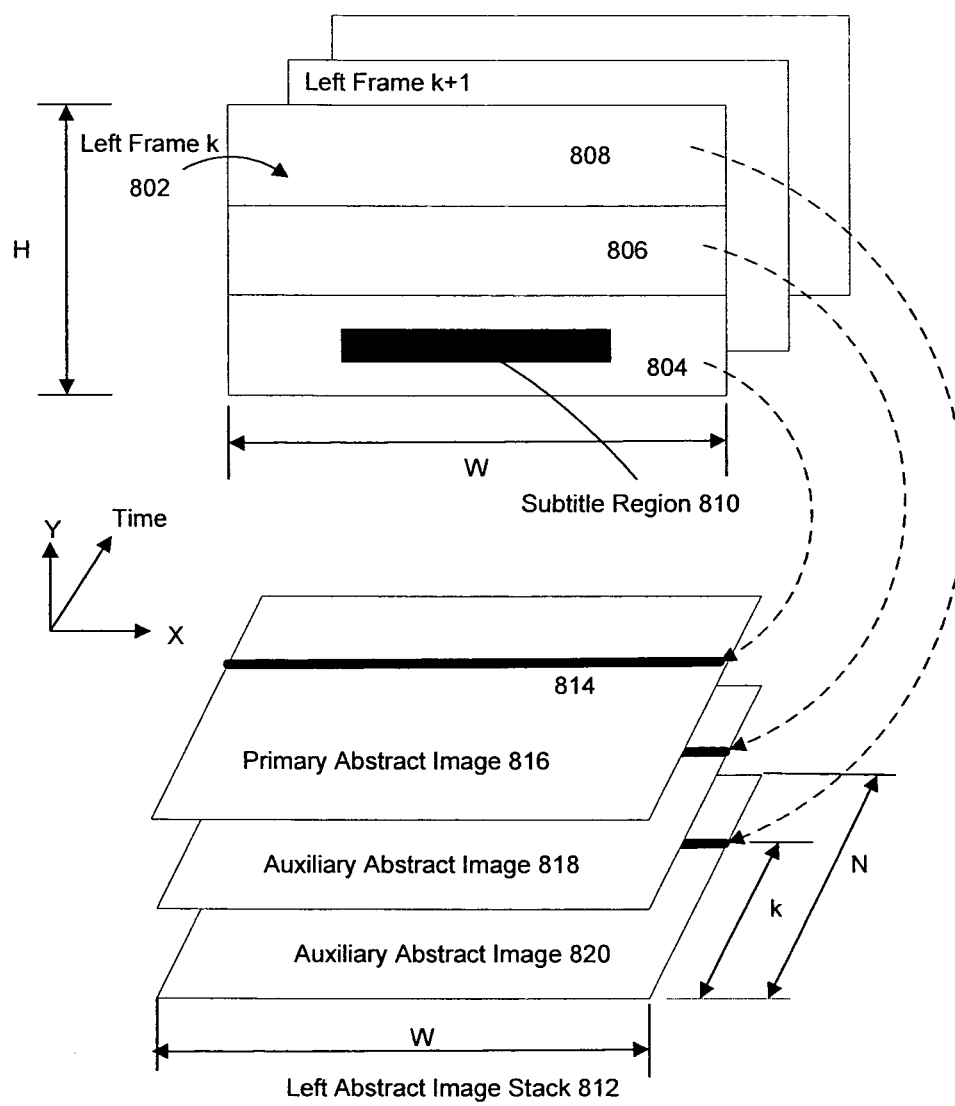

FIG. 8 graphically illustrates multi-region image abstraction according to one embodiment of the present invention.

Figure 9:
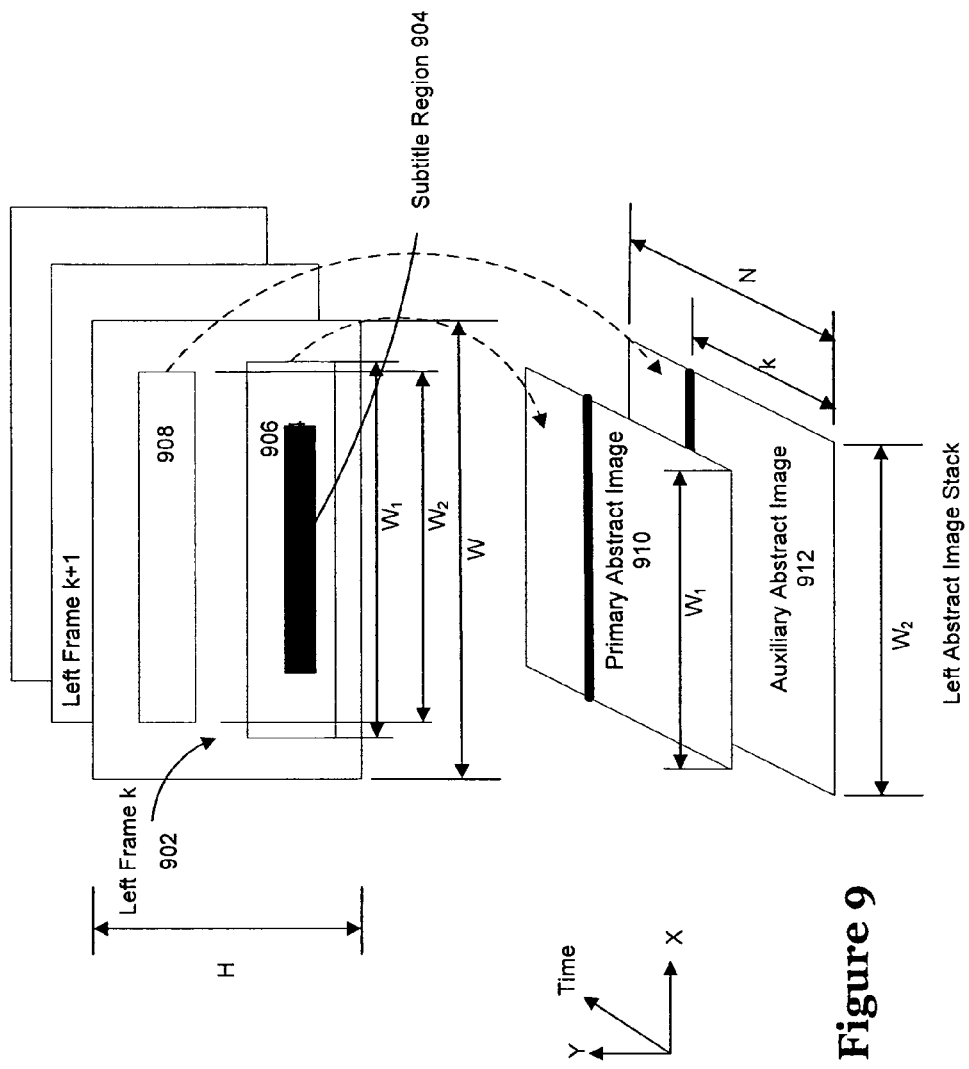

FIG. 9 graphically illustrates a second embodiment of multi-region image abstraction.

Figure 10:
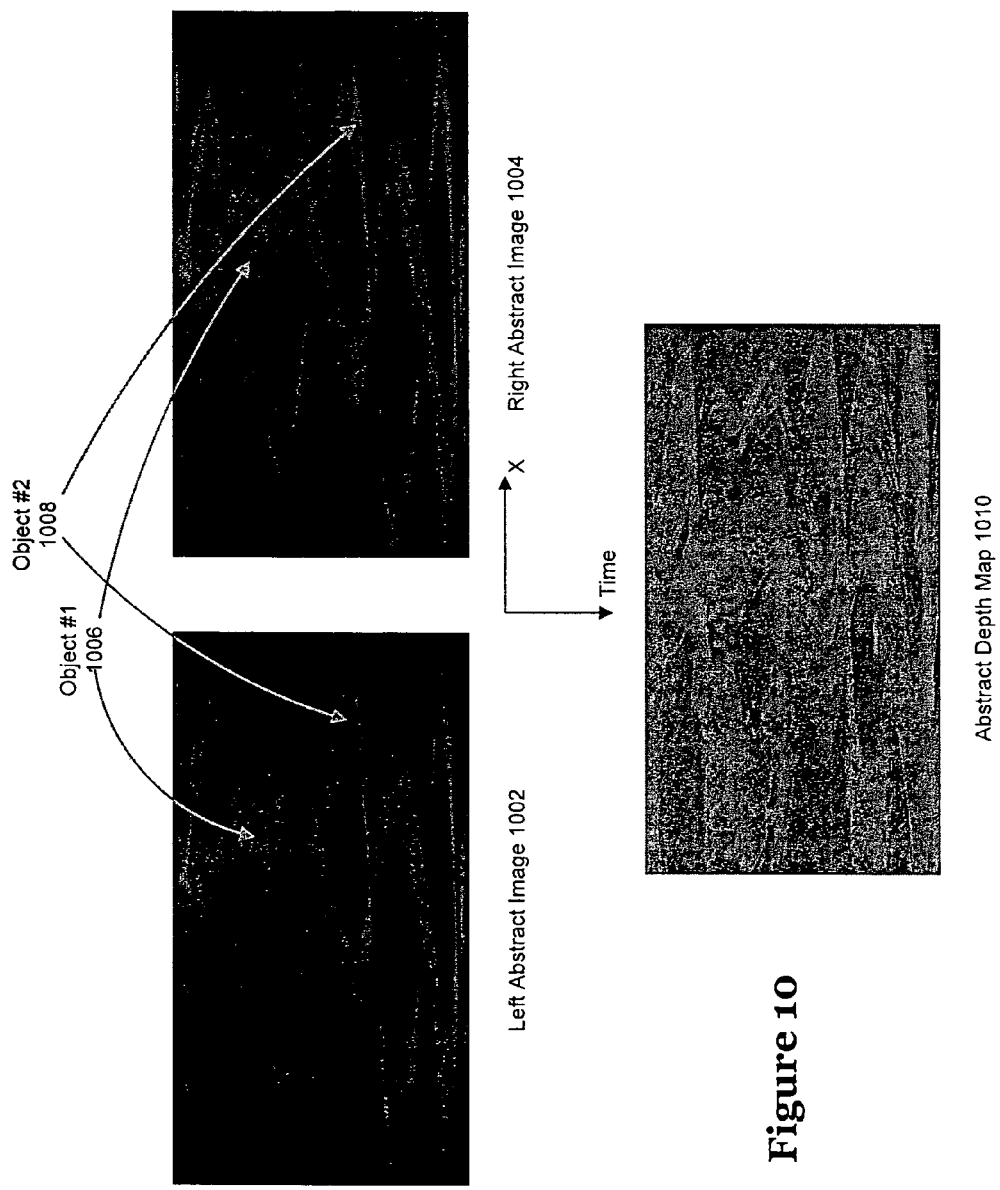

FIG. 10 graphically illustrates an abstract image pair and an abstract depth map according to one embodiment of the present invention.

Figure 11:
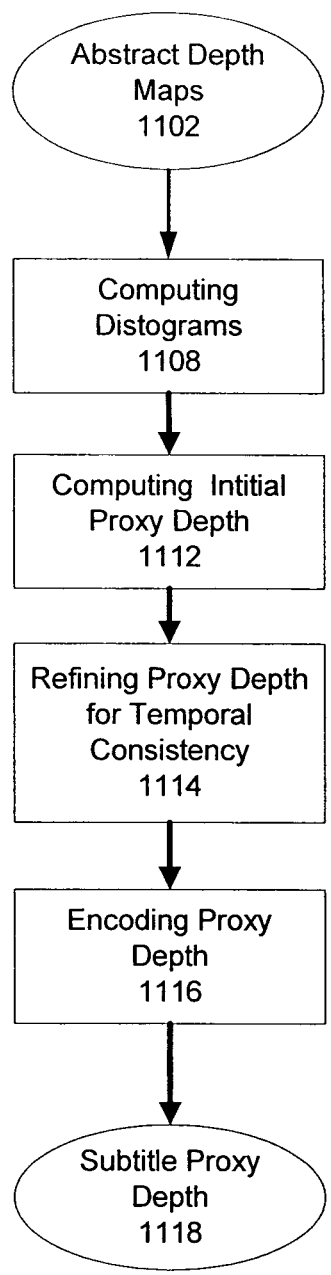

FIG. 11 depicts a functional block diagram of a proxy depth decision module according to one embodiment of the present invention.

Figure 12:
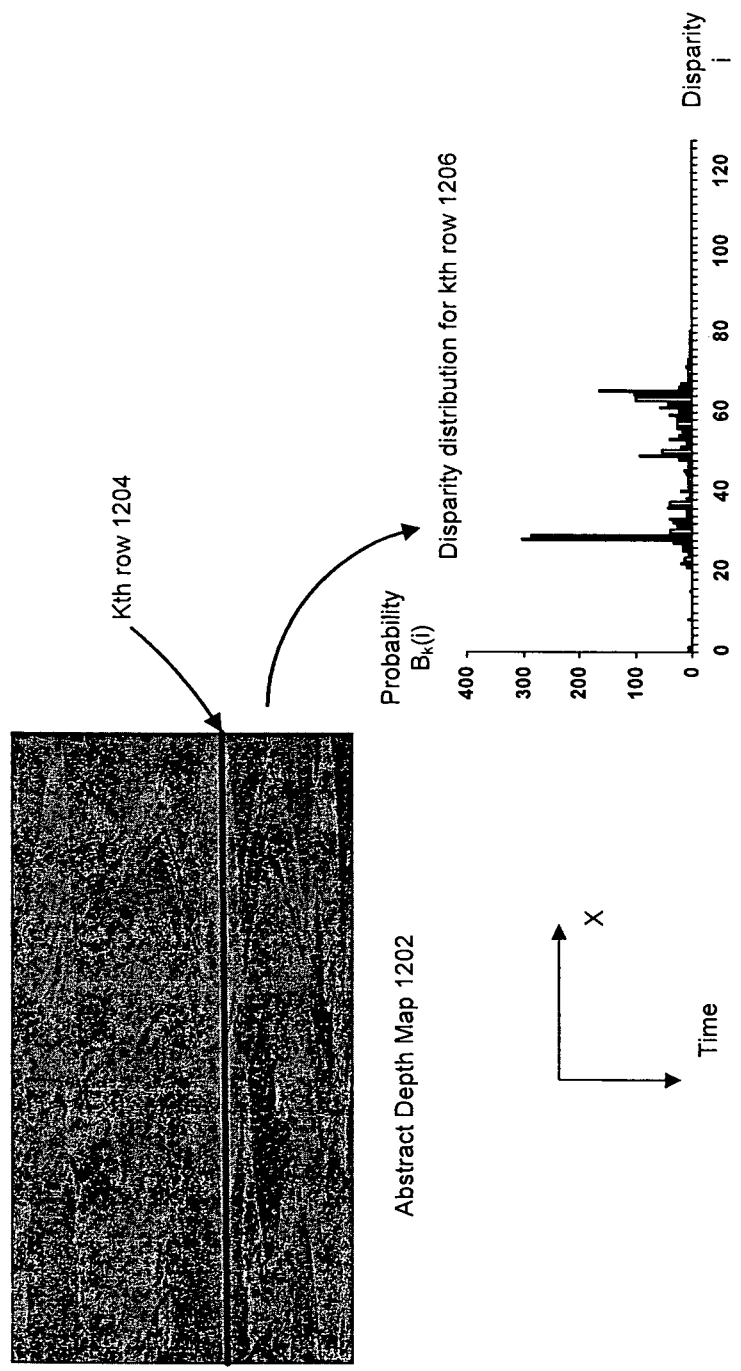

FIG. 12 illustrates disparity distribution of a 3D image segment according to on embodiment of the present invention.

Figure 13:
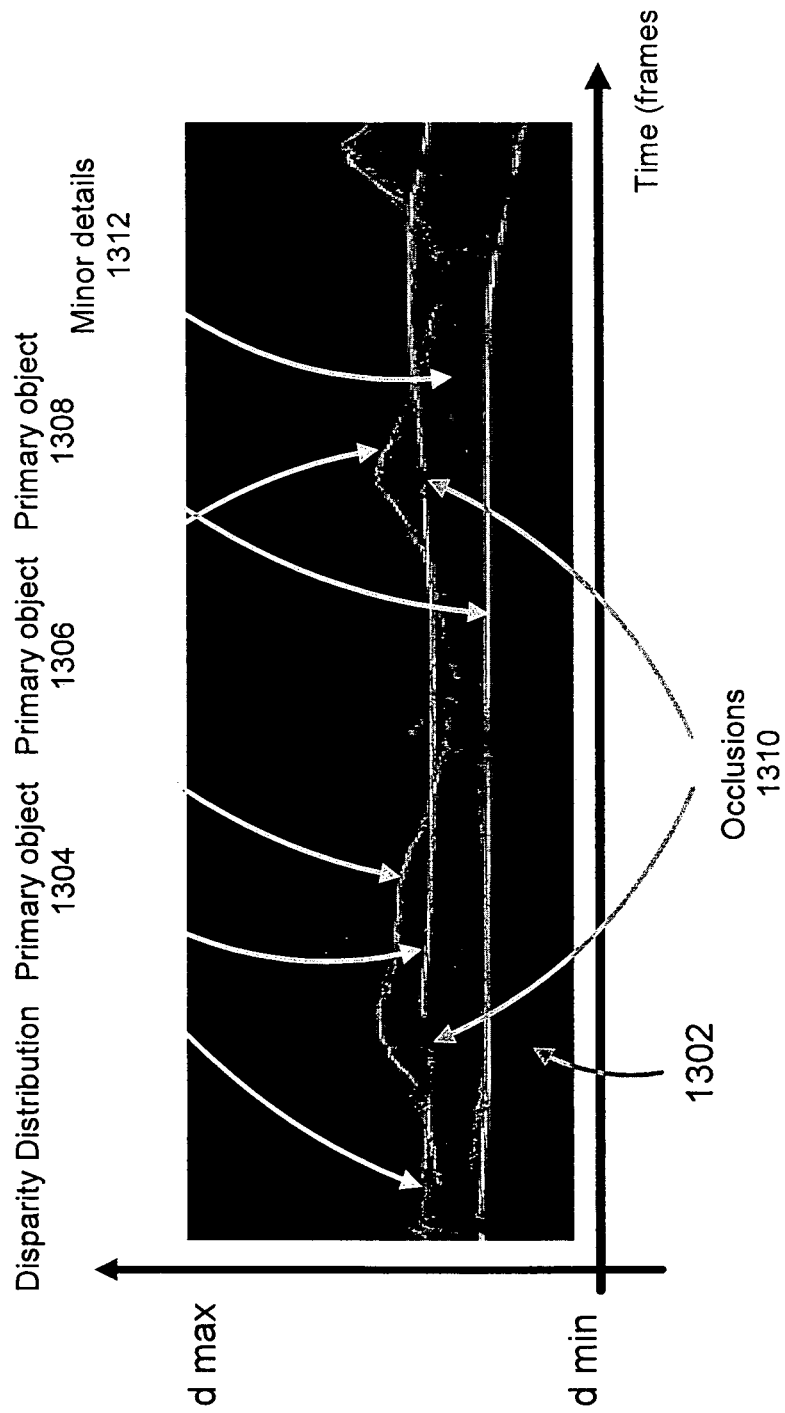

FIG. 13 illustrates a distogram of a 3D image segment according to one embodiment of the present invention.

FIG. 14A is an example of conventional subtitle text file according to one embodiment of the present invention.

FIG. 14B is an example of a 3D subtitle text file with proxy depth according to one embodiment of the present invention.

Figure 15:
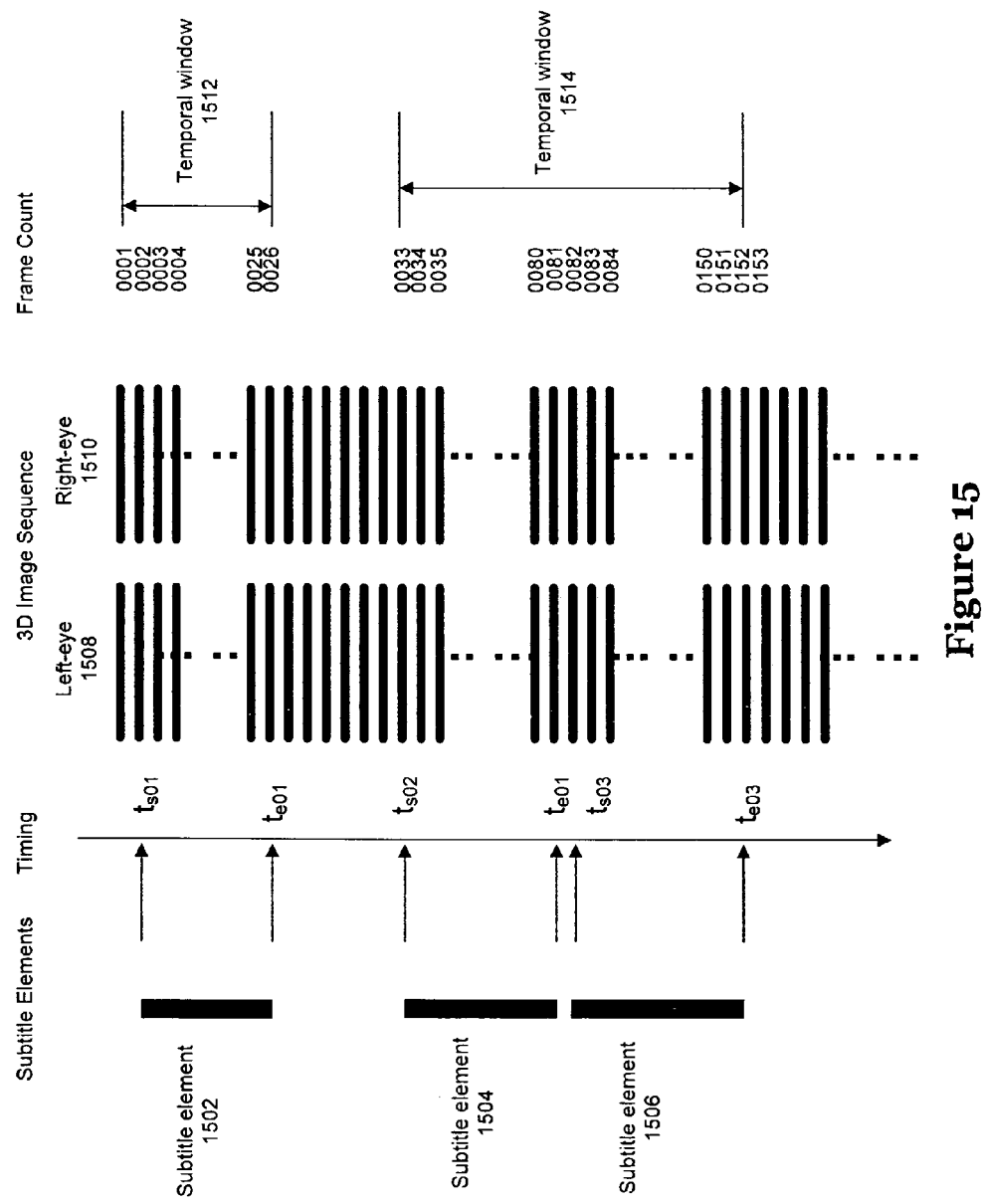

FIG. 15 graphically illustrates temporal window selection according to on embodiment of the present invention.

Figure 16:
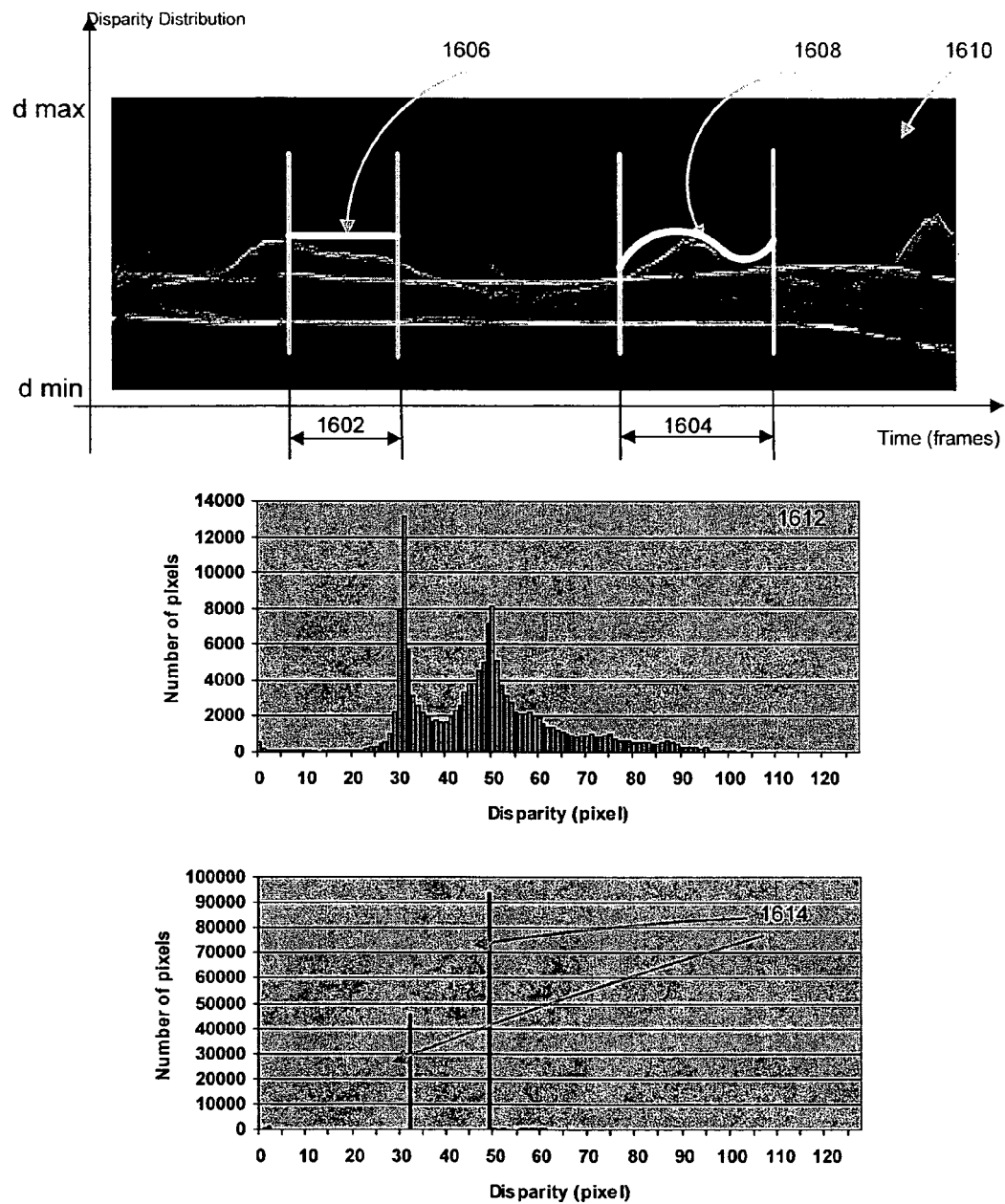

FIG. 16 graphically illustrates determining a proxy depth from a distogram according to one embodiment of the present invention.

Figure 17A:
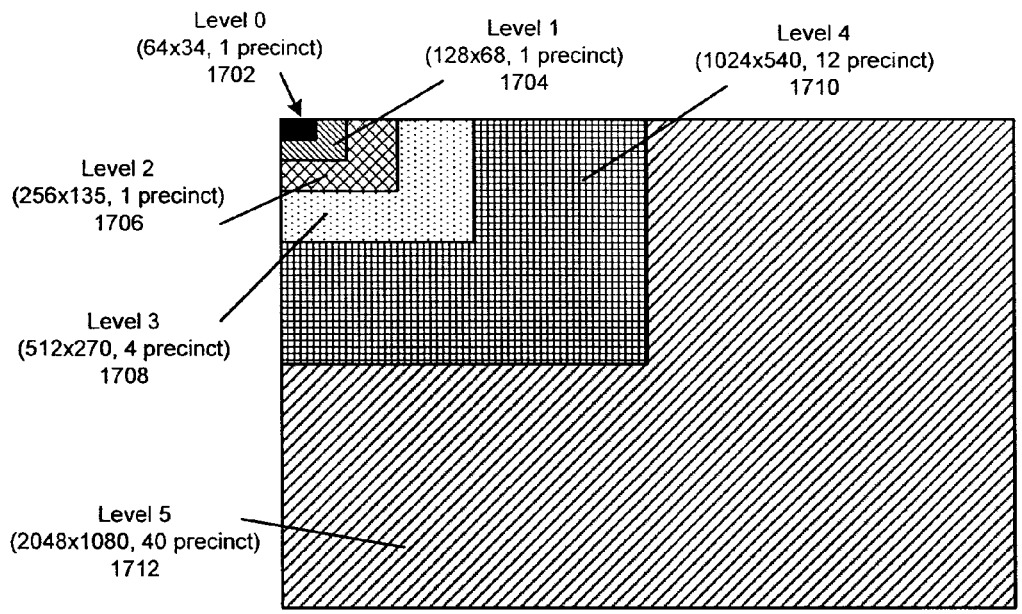
Figure 17B:
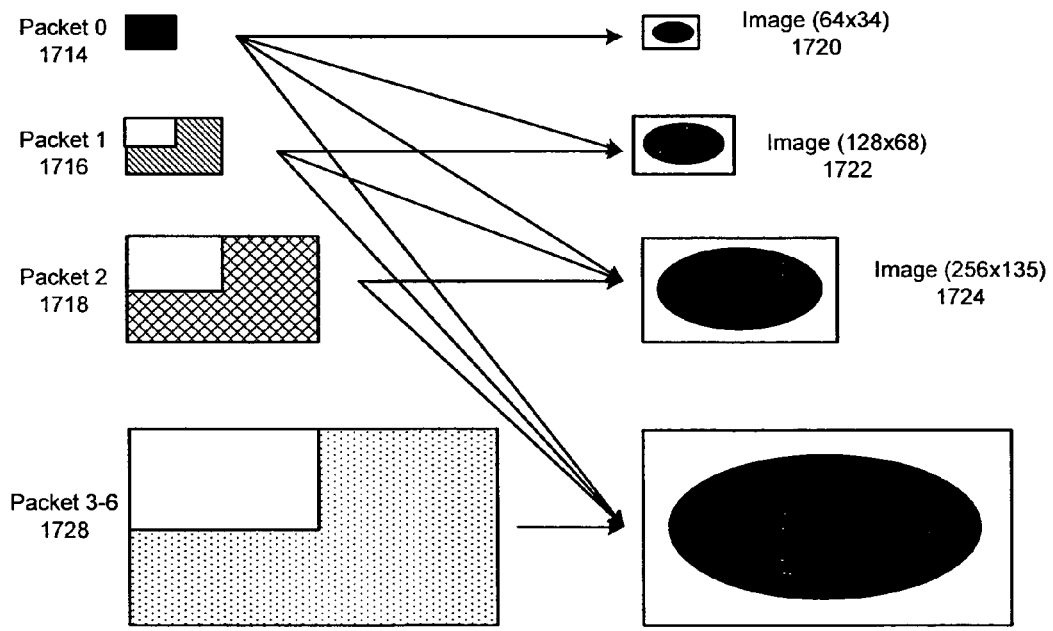

FIGS. 17A and 17B graphically depict selective DCP decoding according to one embodiment of the present invention.

FIG. 18 graphically depicts JPEG2K Level 3 sub-bands and corresponding packets according to one embodiment of the present invention.

Figure 19:
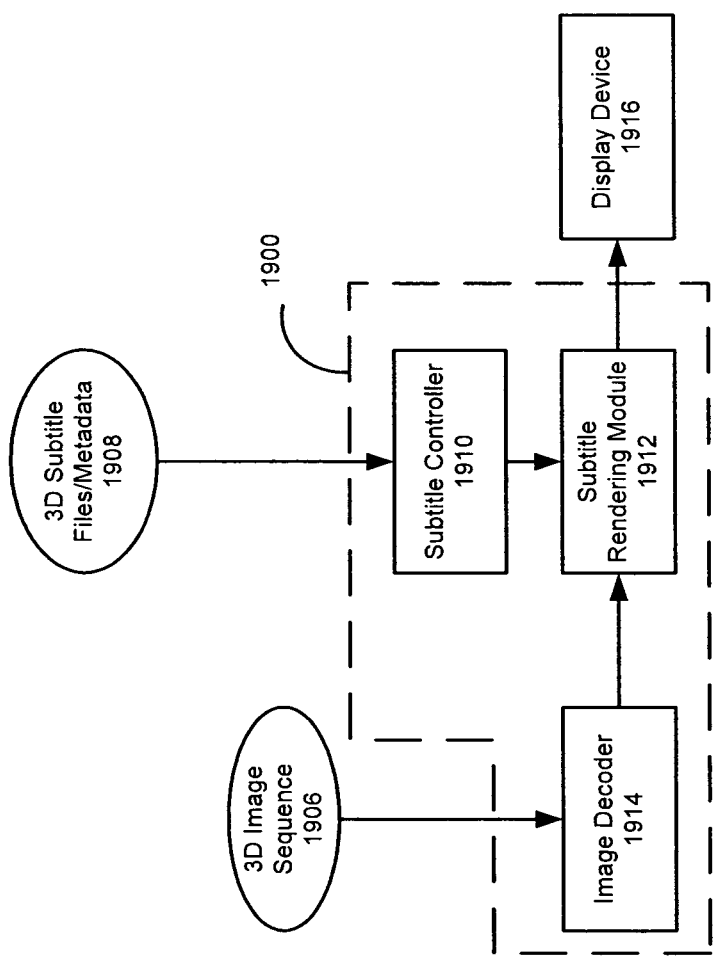

FIG. 19 is a functional block diagram for an offline content adaptive 3D subtitle computing system according to one embodiment of the present invention.

Figure 20:
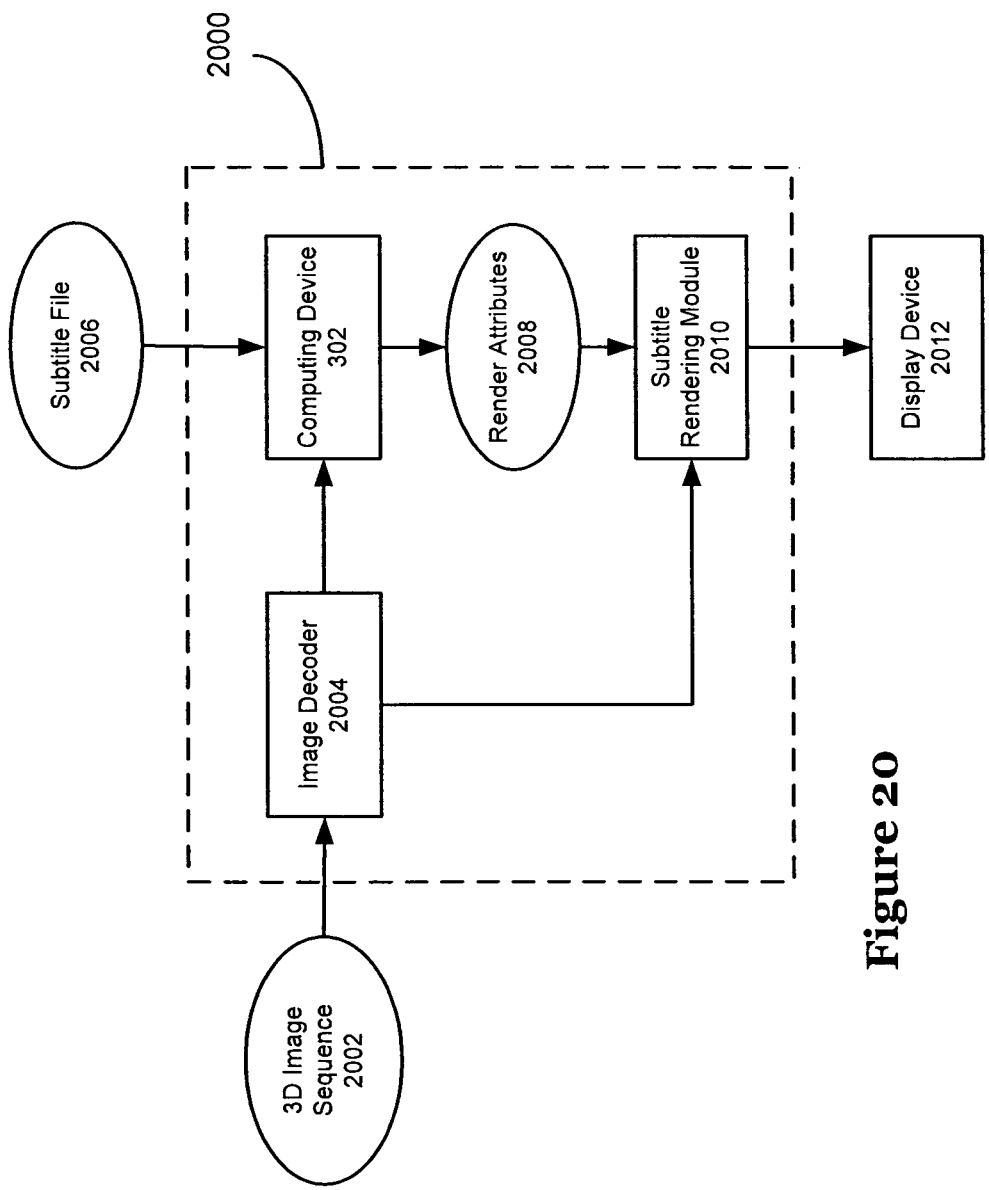

FIG. 20 is a functional block diagram for a real-time content adaptive 3D subtitle computing system according to one embodiment of the present invention.

Figure 21:
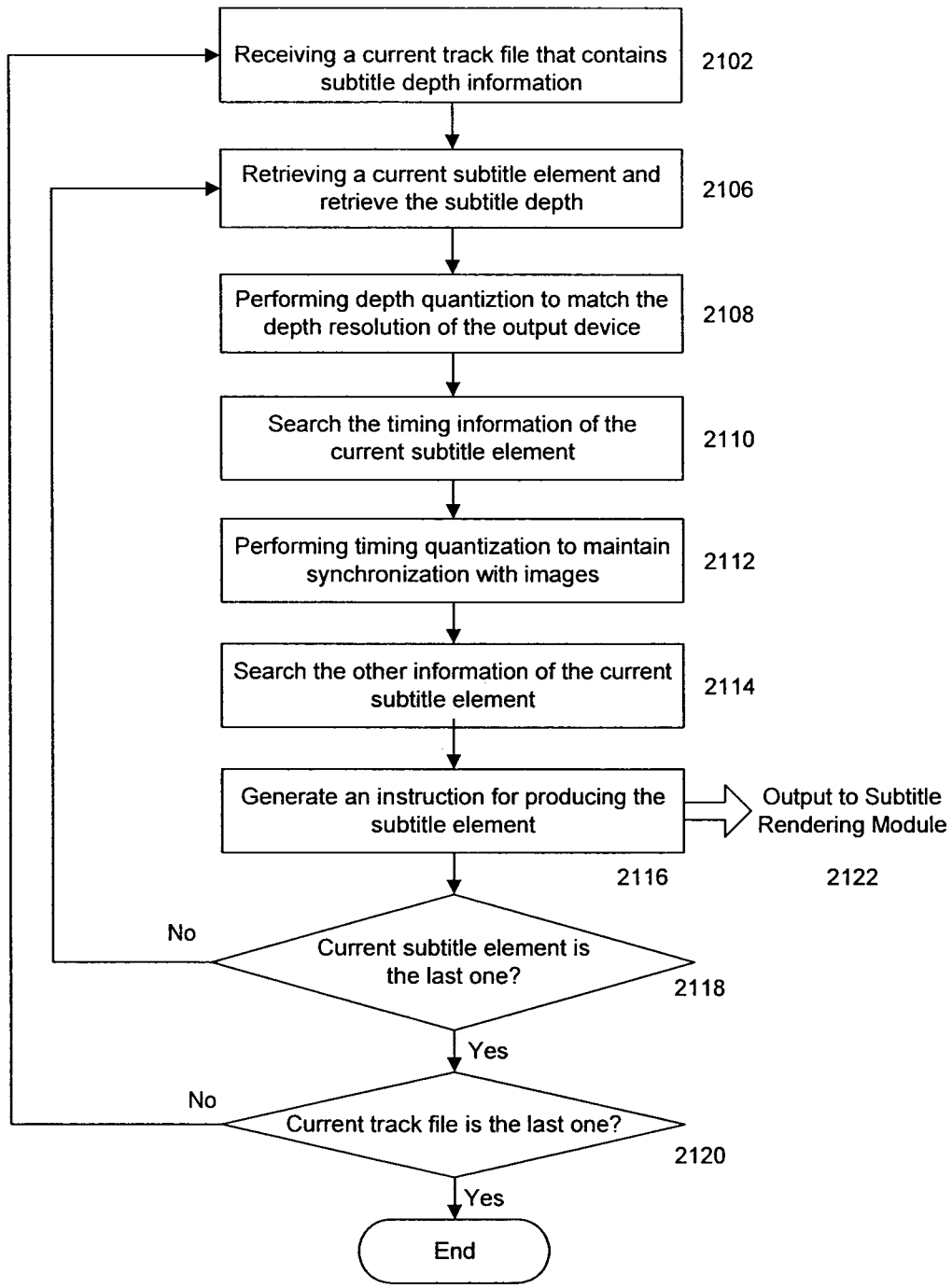

FIG. 21 is a flow chart of a subtitling controller method according to one embodiment of the present invention.

DETAILED DESCRIPTION

Certain aspects and embodiments of the inventive concepts disclosed herein relate to methods and systems for displaying three-dimensional (3D) images with additional information, such as subtitles, at a location and a depth based on the content of the 3D images. While the methods disclosed are generally suitable for any type of 3D stereoscopic display systems, they may have particular applicability to 3D motion picture theaters with an immersive viewing environment.

In some embodiments, additional information that is subtitles is displayed at a depth that is the same as, or is otherwise based on, the depth of content in the 3D image displayed. FIG. 2 depicts one embodiment of a subtitle element 214 displayed at a depth that is based on the depth of a main image object 106 in the 3D image. By displaying the subtitle element 214 at a depth that is based on content of a 3D image, both the 3D image and the subtitle can be viewed simultaneously and comfortably by a viewer 104. Furthermore, if the depth of the main image object 106 changes, the depth of the subtitle element 214 can also change based on the change of depth of the main image object 106.

The depth placement of the subtitle element 214 can be provided in a stereoscopic method by displaying a left-eye view and a right-eye view of the same subtitle element with a proper parallax. The subtitle displayed in such a way can be referred to as a stereoscopic subtitle or otherwise known as a 3D subtitle. The amount of parallax that may be needed for the depth placement of the subtitle can be determined by computing the depth of the main image object 106, or equivalently by computing the pixel disparity values of the main image object 106.

The left-eye view and the right-eye view of a 3D subtitle may be created by horizontally shifting a subtitle element in screen positions. For example, the subtitle text of the left-eye view may be created by horizontally shifting the subtitle element to the right by ten pixels while the corresponding right-eye view of the subtitle text may be created by shifting the subtitle element to the left by ten pixels. The resulting 3D subtitle thus has a disparity of twenty pixels between the left-eye and right-eye views. The actual perceived depth of the subtitle element with such a disparity is dependent both on the display screen size and on the image resolution. For a 2K resolution image with an image width of 2048 pixels that is displayed on a screen with a seventy feet width, the subtitle element with a disparity of twenty pixels can appear to be approximately fourteen feet away from the audience.

The subtitle can be located in front of the closest object in a 3D image at the position of the subtitle element by a fixed amount, which may be a fixed number of additional disparity. For example, if the closest image object is ten feet from the audience, the subtitle element can be placed with four pixels of additional disparity to each eye with a total additional disparity of eight pixels, which effectively places the subtitle approximately two feet closer to the audience than the image object. Since images of a 3D motion picture exhibit a constantly changing depth, the depth of the subtitle may change following the depth of image content and may remain in front of the closest object at the position of the subtitle element in the image. In some embodiments, the additional disparity can be in a range of 1 pixel to 20 pixels for images with a width of 2048 pixels, or in a range of 1 pixel to 40 pixels for images with a width of 4096 pixels. The depth of image objects may be computed using a stereo matching method or other suitable methods.

In some embodiments, stereo matching methods can be used to compute the pixel disparity of 3D images. Typically, a subtitle element appears on the screen when a person begins to speak, or shortly thereafter, and disappears when the person stops speaking. An average duration of display for a subtitle element is a few seconds, but it can be much longer or shorter under certain circumstances. During display of a subtitle element, many frames of images are projected on the screen, and these images may contain temporally changing content, such as object motion, lighting change, scene dissolve and scene cuts.

According to some embodiments of the present invention, a proxy depth value for a subtitle element is computed by analyzing all 3D image frames within a temporal window that corresponds to the duration of the subtitle element. The proxy depth value for a subtitle element may be constant or may vary from frame to frame over the duration of the subtitle. The proxy depth value can be associated with the subtitle element and can be a representative value for that subtitle element. The actual depth placement of a subtitle element may be determined based on the computed proxy depth value. Each subtitle element in a 3D motion picture can be placed in a depth as determined by the proxy depth which is adaptive to image content.

Content adaptive methods according to some embodiments can be extended to other attributes of subtitles, including but not limited to subtitle font style, font size, color, luminance and screen positions. Any type of attribute can be made content adaptive to enhance the viewing experience of a 3D motion picture. An appropriate method or a set of appropriate image analysis methods can be used to determine the placement of each of the said attributes of subtitles.

The depth placement of a subtitle element can be produced by an apparatus through the control of the horizontal positions of the left-eye view and the right-eye view of the subtitle element displayed on a 3D screen. The depth placement produced by the apparatus may or may not be identical to the proxy depth computed. One example of such a difference is that the apparatus may have a limited depth range and depth resolution. The same apparatus may also control the other said content adaptive attributes of subtitles.

The attributes of conventional subtitles can be provided by a text-based subtitle file. One type of information provided by a subtitle file may be the start time and the end time of each subtitle element. Such timing information can be used to determine a temporal window for computing the depth and other content adaptive attributes of a subtitle element.

Figure 3:
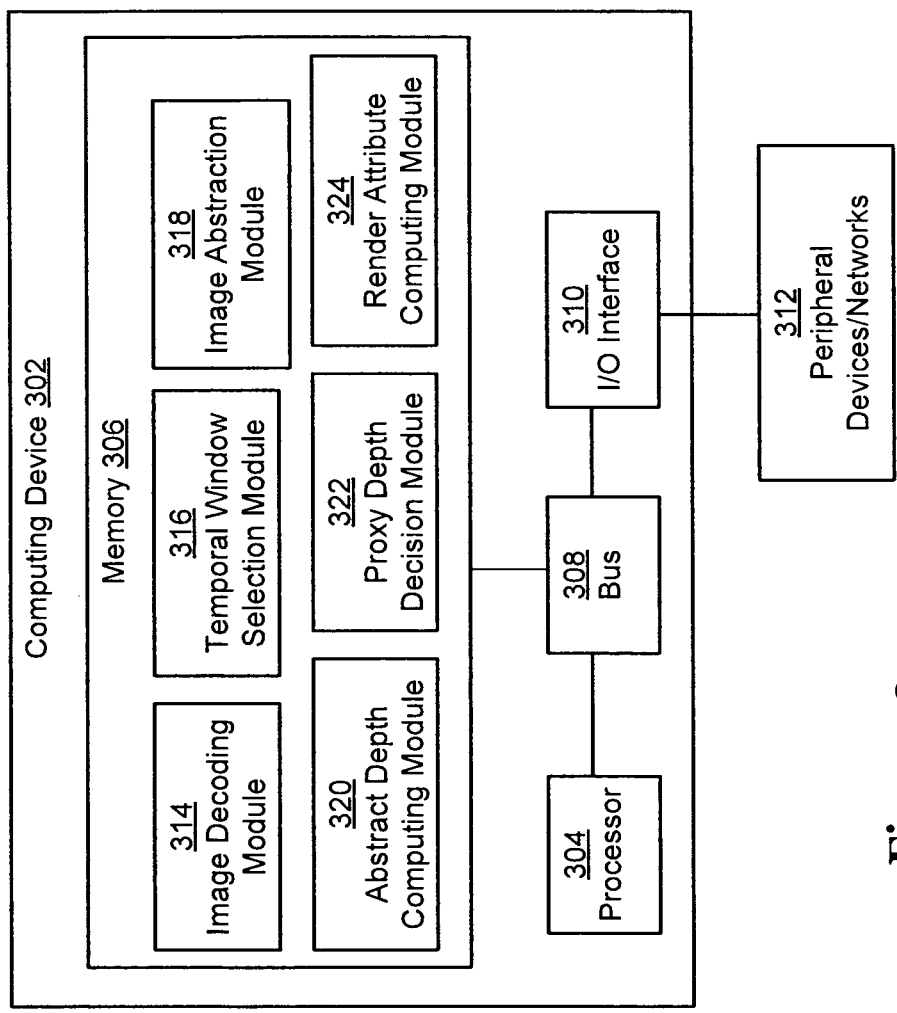
FIG. 3 depicts a system that is capable of determining render attributes for a stereoscopic subtitle to be displayed on a screen with a 3D image according to one embodiment of the present invention.

FIG. 3 illustrates one embodiment of a system that can be used to generate 3D subtitles or other information to be displayed with 3D images. The system includes a computing device 302 having a processor 304 that can execute code stored on a computer-readable medium, such as a memory 306, to cause the computing device 302 to compute subtitle attributes or other information to be displayed with 3D images. The computing device 302 may be any device that can process data and execute code that is a set of instructions to perform actions. Examples of the computing device 302 include a desktop personal computer, a laptop personal computer, a server device, a handheld computing device, and a mobile device.

Examples of the processor 304 include a microprocessor, an application-specific integrated circuit (ASIC), a state machine, or other suitable processor. The processor 304 may include one processor or any number of processors. The processor 304 can access code stored in the memory 306 via a bus 308. The memory 306 may be any tangible computer-readable medium capable of storing code. The memory 306 can include electronic, magnetic, or optical devices, capable of providing processor 304 with executable code. Examples of the memory 306 include random access memory (RAM), read-only memory (ROM), a floppy disk, compact disc, digital video device, magnetic disk, an ASIC, a configured processor, or other storage device capable of tangibly embodying code. The bus 308 may be any device capable of transferring data between components of the computing device 302. The bus 308 can include one device or multiple devices.

The computing device 302 can share data with additional components through an input/output (I/O) interface 310. The I/O interface 310 can include a USB port, an Ethernet port, a serial bus interface, a parallel bus interface, a wireless connection interface, or any suitable interface capable of allowing data transfers between the computing device and peripheral devices/networks 312. The peripheral devices/networks 312 can include a keyboard, a display, a mouse device, a touch screen interface, or other user interface device/output device capable of receiving commands from a user and providing the commands to the computing device 302. Other peripheral devices/networks 312 include the internet, an intranet, wide area network (WAN), local area network (LAN), virtual private network (VPN), or any suitable communications network that allows computing device 302 to communicate with other components.

Instructions can be stored in the memory 306 as executable code. The instructions can include processor-specific instructions generated by a compiler and/or an interpreter from code written in any suitable computer-programming language, such as C, C++, C#, Visual Basic, Java, Python, Perl, JavaScript, and ActionScript. The instructions can be generated by software modules that are stored in the memory 306 and, when executed by the processor 304, can cause the computing device 302 to perform actions.

The software modules can include an image decoding module 314, a temporal window selection module 316, an image abstraction module 318, an abstract depth computing module 320, a proxy depth decision module 322, and a render attribute computing module 324. The image decoding module 314 may be used to decode left-eye image data and right-eye image data that are encoded or encrypted to an uncompressed and non-encrypted format. The temporal window selection module 316 can select a segment of the 3D image data for each subtitle element based on the subtitle timing information in a subtitle file. The image abstraction module 318 can simplify each 3D image segment into a pair of left and right abstract images (e.g. one image from the left-eye image sequence and one image from the right-eye image sequence). The abstract depth computing module 320 can compute an abstract depth map from the left and right abstract images. The proxy depth decision module 322 can compute a proxy depth for a subtitle element based on the abstract depth map. The render attribute computing module can determine a render attribute for a subtitle element, based on the proxy depth for the subtitle element and other image information, for example.

This exemplary system configuration is provided merely to illustrate a potential configuration that can be used to implement certain embodiments. Other configurations may of course be utilized.

Figure 4:
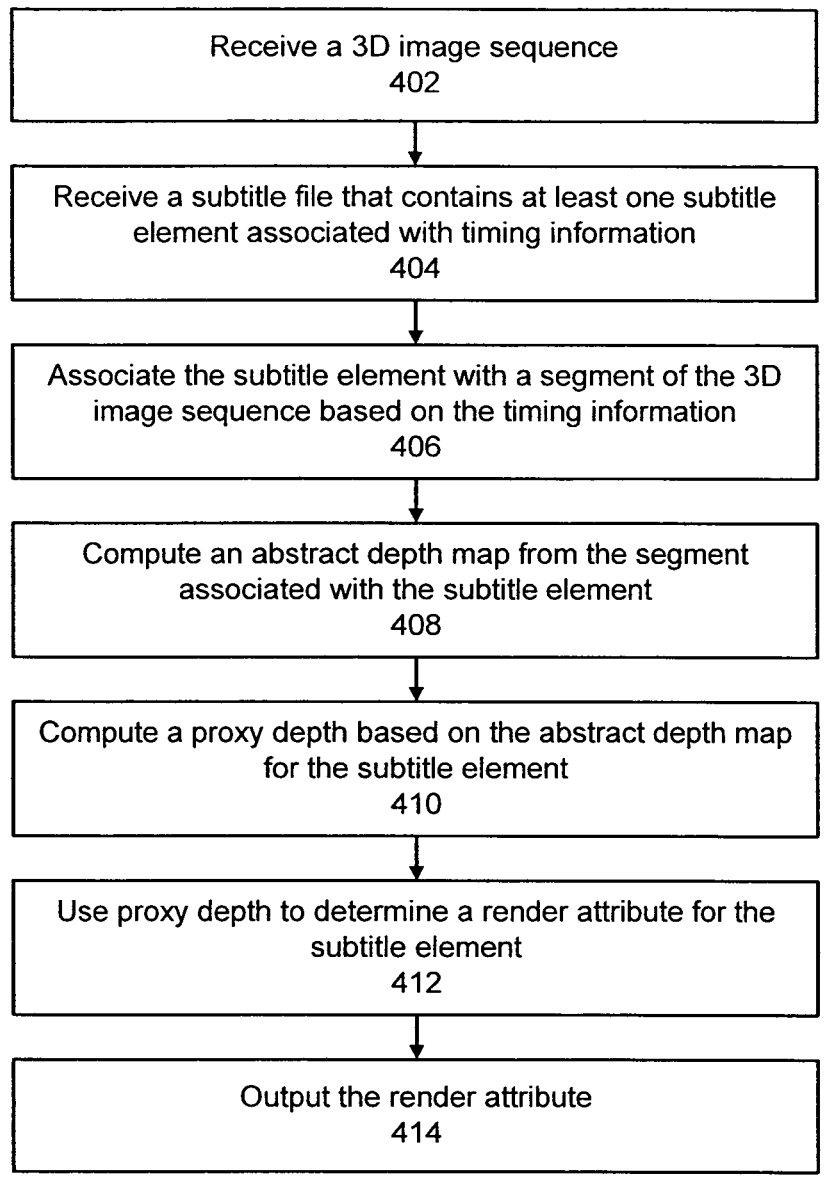
FIG. 4 depicts a flow diagram of a method for computing stereoscopic subtitles to be displayed with a 3D image according to one embodiment of the present invention.

FIG. 4 illustrates one embodiment of a method for computing the attributes for 3D subtitle elements based on the content of the 3D images. Although the method shown in FIG. 4 is described as applying to subtitles, the method can apply to any type of information in addition to the 3D images. Furthermore, FIG. 4 is described with reference to the system of FIG. 3, but other implementations are possible.

In block 402, a 3D image sequence is received by the computing device 302. The 3D image sequence can include a left-eye image sequence and a right-eye image sequence that is associated with the left-eye image sequence. In some embodiments, the 3D image sequence is received as an encoded file, such as a Digital Cinema Package (DCP) file or an MPEG2 video file. The image decoding module 314 can decode the encoded file to an uncompressed and non-encrypted file format.

In block 404, the computing device 302 receives a subtitle file that includes at least one subtitle element associated with timing information. The timing information can correspond to timing information of the 3D motion picture. The subtitle element can include text or other attributes or any other additional information for display with the 3D image sequence.

In block 406, the computing device 302 can associate the subtitle element with a segment of the 3D image sequence based on the timing information. The temporal window selection module 316 can select a segment of images from the 3D sequence based on the timing information of the subtitle element. In some embodiments, the temporal window selection module 316 can save computation time by skipping sections of image sequences that are not associated with subtitles, while processing the remaining sections. The image sequences may also be partitioned into segments based on a limitation on the length of the image sequence. Each segment can be associated with a subtitle element using timing information. For example, each image segment is associated with a time window and can be associated with subtitle elements having timing information that is within the time window.

In block 408, the computing device 302 computes an abstract depth map from the image segment associated with the subtitle element. An abstract depth map may be a representation of depth values, or pixel disparity values, for image frames or certain image frames of the segment. In some embodiments, the image abstraction module 318 can simplify the segment into a pair of left and right abstract images, one from the left-eye image sequence of the segment and one from the right-eye image sequence of the segment. An abstract image may be a simplified version of an image segment in which each image frame of the segment is reduced to a single line of the abstract image by projecting each column of pixels of an image frame into a single pixel. A left abstract image that is projected in such a way from a left-eye image segment and a right abstract image that is projected from the corresponding right-eye image segment forms an abstract image pair. The abstract depth computing module 320 can compute the depth values, or the pixel disparity values, of an abstract image pair and store the resulting depth information in an abstract depth map. The abstract depth map can include depth values, or the pixel disparity values, of all pixels or certain pixels of the abstract image pair.

In block 410, the computing device 302, computes a proxy depth based on the abstract depth map for the subtitle element. A proxy depth may be a representative depth for a subtitle element, and it may be a constant or a variable value over the duration of the subtitle element. The proxy depth can represent changes in depth over time in the 3D image sequences. In some embodiments, the proxy depth decision module 322 computes a proxy depth for the subtitle element that is a constant value or a value that changes over the duration of the subtitle element.

In block 412, the computing device 302 uses the proxy depth to determine a render attribute for the subtitle element. Examples of render attributes include depth placement, font size, font color, position on screen and font style of 3D subtitles as well as the color, size, position, and style of additional information, such as images. In some embodiments, the render attribute computing module 324 uses the proxy depth, which is based at least in part on the depth of content of an associated 3D image sequence, to determine a render attribute that includes at least one instruction for rendering the subtitle element. For example, the proxy depth may be determined to be the render attribute of depth for the subtitle element, or used to determine the render attribute of depth for the subtitle element.

In block 414, the computing device 302 outputs the render attribute for the subtitle element. The render attribute can be used to render the subtitle element to be displayed with the 3D image sequence.

The following describes additional embodiments of the modules and features discussed above.

Image Abstraction

Embodiments of the image abstraction module 318 can perform various functions such as simplifying a 3D image sequence into a pair of abstract images, one for the left-eye and one for the right eye, through image projection. The projection can be performed vertically so that each column of pixels in an image frame is projected into a single pixel, and each frame is projected into a single line. The projected lines from each of the image frames of the 3D image sequence can form a pair of abstract images.

A graphical illustration of an embodiment of an image abstraction process is depicted in FIG. 5. A left-eye image sequence 502 is shown that includes N frames, and each frame includes H lines. Each line includes W pixels. The left-eye image sequence 502 can be projected into a left abstract image 506 with N lines, with each line including W pixels. The first line of the left abstract image 506 can be projected from the first frame of the left-eye image sequence, and the second line of the left abstract image 506 can be projected from the second frame of the left-eye image sequence, etc. The projected lines can form an W×N left abstract image 506. Similarly, the right-eye image sequence 504 can be projected into a right abstract image 508 with N lines and W pixels in each line. Both the left abstract image 506 and the right abstract image 508 form an abstract image pair.

In some embodiments, the projection is performed based on a vertical sampling projection algorithm, an embodiment of which is depicted in FIG. 6. The position of a subtitle element can be pre-defined or specified in a subtitle file. Subtitle elements can be centered near the bottom of an image frame, but other positions are also possible. FIG. 6 shows the subtitle element contained in a subtitle region 604 of the kth left image frame 602 of an image sequence. A sampling line 606 can be selected near or at the center of the subtitle region 604. The pixels of each column of the kth left image frame 602 can be projected into a single pixel towards the sampling line 606 to form the left abstract image 610. For example, all, or substantially all, pixels of image column m 608 can be projected towards point A on the sampling line, and projection can be performed so that the pixels above the sampling line are projected downwards and pixels below the sampling line are projected upwards. The result of projection can produce pixel B in the left abstract image 610, at the location of (m, k).

The value of projected pixel B can be determined by a projection function selected. The projection function can be selected to compress the original 3D image sequences into a pair of abstract images, while preserving both depth information and depth change information. In one embodiment, the projection function is based on mathematical average. In another embodiment, the projection function is a weighted average with higher weights assigned to pixels closer to the sampling line. The projection process can be repeated for each column of image frame k, and the result is the kth line 612 in the left abstract image 610. A similar projection method can be applied to the right-eye image frame to produce a right abstract image (not shown in FIG. 6).

Another embodiment of the vertical sampling projection algorithm uses multiple sampling lines, which can be a multiple vertical sampling projection algorithm. An example of such an algorithm is depicted in FIG. 7, in which a kth left image frame 702 is divided into three regions: (i) a primary region 716 containing the subtitle region 704 and two auxiliary regions, (ii) a top region 720, and (iii) a center region 718.

A sampling line can be selected for each region. The sampling line selected for the primary region 716 may be a primary sampling line 706 that can be selected near or at the center of the subtitle region 704. The primary sampling line can be assigned a primary role in a projection algorithm through appropriate weights in the projection function. In one embodiment, pixels closer to the primary sampling line are assigned to higher weights than those closer to auxiliary sampling lines. The sampling line selected for an auxiliary region may be an auxiliary sampling line that can be located at, but not restricted to, the center of the region. In the example shown in FIG. 7, the auxiliary sampling line 710 represents the depth change at the top auxiliary region 720 of the image frame, and the auxiliary sampling line 708 represents the depth change at the center auxiliary region 718 of the image frame. Vertical sampling projection can be performed within each region so that pixels are vertically projected towards the sampling line of the region.

In the example shown in FIG. 7, the pixels of the mth column 722 within the primary region 716 are projected towards point A on the primary sampling line 706; the pixels of the same column within the region 718 are projected towards point B on the auxiliary sampling line 708, and the remaining pixels of column m within the top region 720 are projected towards point C on the auxiliary sampling line 710. In some embodiments, the number of divided regions and the location of sampling lines are determined based on number of factors including the position of the subtitle region, the aspect ratio of 3D images, and theatre geometry. For example, more sampling positions may be used for IMAX® 15 perf/70 mm image format with a projection aspect ratio of 1.43:1 than a Scope image format with a projection aspect ratio of 2.40:1. The projected values can be further combined in a format of weighted average to produce the value at point D of line k 714 of the left abstract image 712. A similar projection method can be applied to the right-eye image frame to produce a right abstract image (not shown in FIG. 7).

In another embodiment, a left or right image frame is divided into multiple regions and each region is projected into a distinctive abstract image pair, as depicted in FIG. 8 for a left-eye image sequence. Vertical sampling projection algorithms can be applied to each region of the left image sequence, and an abstract image pair can be produced from each region, resulting in multiple abstract image pairs that form an abstract image pair stack 812. The position of a sampling line for each region can be selected based on the principles discussed previously. The region that includes the subtitles may be assigned as a primary region 804 and can produce a primary abstract image pair 816 (the right abstract image is not shown in FIG. 8). The other regions may be regarded as auxiliary regions 806, 808, and each produces an auxiliary abstract image pair 818, 820 (the right abstract image is not shown in FIG. 8). As a result, the primary abstract image pair 816 can describe depth changes in the vicinity of subtitles, while the other auxiliary abstract image pairs 818, 820 can describe depth changes in designated regions. A similar projection method can be applied to the right-eye image frame to produce multiple right abstract images (not shown in FIG. 8).

In another embodiment, an abstract image pair is projected from a selected region of an image frame so that it may not have the full width of the image frame. An example is depicted in FIG. 9. Two selected regions of the kth image frame can be identified for the left image sequence—one may be a primary region 906 that contains the subtitle region 904 and the second may be an auxiliary region 908 near the top of the images. The subtitle region 904 depicted has a width of $W_1<W$, and the auxiliary region 908 has a width of $W_2<W$. A primary abstract image pair 910 (the right abstract image is not shown in FIG. 9) can be projected from the primary region 906 and an auxiliary abstract image pair 912 (the right abstract image is not shown in FIG. 9) can be projected from the region 908. In some embodiments, the pixels outside the selected regions are not used in projection. The resulting primary abstract image 910 can be a $W_1 \times N$ image and the auxiliary abstract image 912 is a $W_2 \times N$ image. This method may allow depth analysis to be focused on key portions of the images.

Abstract Depth Analysis

Certain embodiments of the vertical sampling projection algorithm can allow computation of depth change information in a 3D image segment and, in some embodiments, relatively fast computation. FIG. 10 shows an example of abstract image pair (1002, 1004) produced from a 3D image segment of over 1450 frames. The resulting abstract image pair can represent object motion information of a 3D image sequence. The movement of main objects in the sequence can be used for subsequent analysis. An example of abstract image pair (1002, 1004) is depicted in FIG. 10, which can be computed from a 3D image segment of over 1450 frames. The abstract image pair (1002, 1004) can represent the movement of two main objects 1006 and 1008 in the segment, moving into and out from the foreground of the images with respect to each other. The change of depth as the result of such object motion can be recorded by an abstract depth map 1010, which can be produced by estimating pixel disparity between the left abstract image 1002 and the right abstract image 1004. In some embodiments, the computation of abstract depth maps can be performed by the abstract depth computing module 320.

Certain embodiments of the abstract depth computing module 320 allow fast computation of depth information in a 3D image segment. Traditional methods of computing pixel disparity of an 3D image sequence can be very time consuming and unreliable. By simplifying a 3D image segment into a pair of abstract images, the computation of depth can be sped up drastically in some cases, and the resulting depth (or disparity) can be more reliable and temporally consistent.

In one embodiment, disparity is computed directly from the abstract image pair (1002, 1004). In another embodiment, disparity is computed using a coarse-to-fine Bayesian method in which the left and right abstract images are first converted to a pyramid representation with multiple levels of detail. The computation begins at the most coarse level (the top level), and the disparity of every pixel between the abstract image pair can be estimated by minimizing a special energy function consisting of a data cost term and a link cost term. The resulting disparity values can be further categorized into a limited number of groups through a clustering method, each representing a candidate object with a representative depth (or disparity). The results from the top level can be used as an initial estimate for computation at a lower level, and the depth of a candidate object can be refined with more details estimated at that level. This process can be repeated until the depth of candidate objects are refined with the full details estimated from the lowest level (fine level). The collection of the resulting depth (or disparity) forms an image that may be an abstract depth map. An example of an abstract depth map 1010 is shown in FIG. 10. The abstract depth map 1010 may have the same pixel resolution as the abstract images (1002, 1004), but it contains depth (or disparity) values instead of color or light intensity. If multiple abstract image pairs are generated, a separate abstract depth map can be produced from each pair of abstract images.

Proxy Depth Decision

Certain embodiments of the proxy depth decision module 322 can determine the proxy depth of a subtitle element based on the abstract depth maps generated by the abstract depth computing module 320. As disclosed previously, the proxy depth of a subtitle element is a representative depth value that can be used to determine the depth placement of the subtitle element. A proxy depth may have a constant or variable value over the duration of a subtitle element.

An embodiment of a functional block diagram for the proxy depth decision module 322 is depicted in FIG. 11. In some embodiments, computing a proxy depth is based on a robust analysis of temporal and statistical distributions of pixel disparity (or pixel depth) of a 3D image segment using a distogram. Such computations may provide an accurate and reliable proxy depth representation. A distogram is a graphical illustration of probability distribution of pixel depth (or disparity) in time of a 3D image segment. In FIG. 11, the computation of distograms can be performed by a computing module 1108. The computation of initial proxy depth can be performed by a computing module 1112 based on the distograms In some embodiments, the initial proxy depth values may have an abrupt jump between adjacent subtitle elements, which may produce abrupt changes in subtitle depth placement and cause viewing discomfort. A temporal consistency module 1114 can be used to smooth out the transition of proxy depth values between adjacent subtitle elements. The resulting proxy depth values can be encoded in a specified data format by a computing module 1116. An example of a proxy depth data format 1118 is a text format file containing both timing and proxy depth information.

In some embodiments, the proxy depth of subtitles may be computed using robust statistical analysis methods. The statistical distribution of 3D image depth can be collected from an abstract depth map in a form of a disparity distribution, as depicted in FIG. 12. A disparity distribution $B_k$ (i) 1206 can represent the probability distribution of disparity of the kth image frame in the range between $d_{min}$ and $d_{max}$, representing the minimum and maximum disparity values of an image sequence. The value of such disparity distribution can be computed from the kth row 1204 of the abstract depth map. As a result, a disparity distribution can contain $d_{max}-d_{min}+1$ bins, and the value of the ith bin $B_k(i)(d_{min} \leq i \leq d_{max})$ can record the probability of pixels of the kth image frame that has a disparity value of i. In FIG. 12, an example of such a disparity distribution 1206 is shown, which is collected from the kth row 1204 of the abstract depth map 1202.

The disparity distributions of all image frames in a 3D image segment can be used to form a distogram. An example of a distogram is plotted in FIG. 13. In the example distogram 1302, the horizontal axis represents frame interval (associated with time) and the vertical axis represents the value of disparity (associated with depth). For an image segment of N frames, the resulting distogram may be a graphical illustration with $d_{max}-d_{mm}+1$ rows and N columns. The kth column of the distogram records the disparity distribution of the kth frame, and the intensity of a point on the kth column represents probability of pixels in the kth image frame that have a certain depth (or disparity) value. The example of distogram of FIG. 13 is computed from the abstract depth map 1010 example of FIG. 10.

A distogram can describe the evolution of statistical distribution of depth (in a form of disparity) over the temporal duration of an image sequence. It can be used to separate the depth change of primary objects in a scene from other relatively minor details of the scene. The intensity of the distogram can represent the distribution of image pixels at a certain depth range, and a large intensity value represents a concentration of pixels in a certain depth. As a result, a prominent object of a relatively large size can be distinguished by a motion depth path with relatively brighter intensity values. In FIG. 13, the distogram 1302 shows the depth motion path of three primary objects. The first primary object 1304 starts right in the foreground at the beginning of the image segment, but it becomes occluded by the second primary object 1306, which moves from behind to the foreground. The depth motion path of these two objects crosses a number of times, indicating that they takes turns to appear in the foreground of the scene. Meanwhile, a third primary object 1308 remains behind the other two primary objects for the entire image sequence, which may be the background of the scene. The hazy point clouds between these primary objects may represent smaller objects or other minor details 1312, whose depth may not be as critical for the proxy depth decision as the primary objects. Distinctive paths can be extracted from the distogram as a reliable measure of depth evolution of prominent objects in a scene using statistical methods. Breaks in a path can indicate strong occlusion between objects, such as the occlusions 1310 in FIG. 13.

The computation of 3D subtitle proxy depth may use timing information that defines a temporal window for a subtitle element. Subtitle elements may be specified in a subtitle file, for example a text based file in a specific format. An example of a conventional subtitle file in XML text file format is shown in FIG. 14A. The timing information of each subtitle element, including the start time ("TimeIn") and end time ("TimeOut"), can be defined in the file. The example of the subtitle file in FIG. 14A also includes subtitle attributes such as text screen position placement information including horizontal alignment ("HAlign"), vertical alignment ("VAlign"), horizontal position ("HPosition"), and vertical position ("VPosition"). The screen position can be defined by the number of pixels or by a percentage of the screen height. The information defined a subtitle file can be used by a subtitle system to produce subtitle images to be superimposed onto motion picture images.

The timing information in a subtitle file can be used for selecting a temporal windows for a subtitle element as performed by the temporal window selection module 316 of FIG. 3. In some embodiments, when a number of consecutive subtitle elements follow closely to each other, they may share a single proxy depth in order to minimize abrupt jumps in depth. In such a case, a temporal window may include a number of subtitle elements. In an example depicted in FIG. 15, a first subtitle element 1502 starts at time $t_{s01}$ and ends at time $t_{e01}$ of an image sequence. The start time $t_{s01}$ corresponds to frame 0002 and the end time $t_{e01}$ corresponds to frame 0026. The proxy depth of the first subtitle element 1502 can be determined within a range of frames 0002-0026, so that the temporal window 1512 has a length of 25 frames starting from frame 0002. In another example in FIG. 15, subtitle element 1504 starts at frame 0033 and ends at frame 0081. The next subtitle element 1506 follows subtitle element 1504 closely such that element 1506 starts at frame 0082 immediately after the end frame 0081 of subtitle element 1504. Subtitle elements 1504 and 1506 may share the same proxy depth so that they are included in the same temporal window 1514 starts at frame 0033 and ends at frame 0152 with a length of 120 frames. Each temporal window can contain image frames from both the left-eye images 1508 and the right-eye images 1510. In some embodiments, the length of a temporal window can be selected to exceed the duration of a subtitle element.

Once a temporal window is selected, a 3D image segment can be partitioned from a 3D image sequence. A proxy depth can be computed from a distogram for each temporal window. A proxy depth may be a time-varying function over the length of a temporal window and it may have a constant value. In FIG. 16, a constant proxy depth can be assigned for the temporal window 1602, while a time-varying proxy depth can be assigned for another temporal window 1604. In the example of FIG. 16, the proxy depth for the temporal window 1602 is determined by averaging each of the columns of the distogram 1610 that belong to the window 1602 into a single disparity distribution 1612. The disparity distribution 1612 may display two dominant depth clusters, one centered around a depth equivalent to a disparity of 30 pixel, and the second centered at a depth equivalent to a disparity of about 50 pixels. These clusters may indicate the presence of dominant objects in the scene. A clustering algorithm, such as mean-shift filtering, can be applied to the disparity distribution of 1612 to detect dominance modes. The result is plotted in the graph of 1614 with two dominant modes, one with a disparity of 32 pixels and the second with a disparity of 49 pixels. A constant proxy depth can be determined based on the presence of a most influential dominant mode of 49 pixels. A time-varying proxy depth, such as the example of 1608, can be determined by following the depth change of the dominant modes within a temporal window. The disclosed proxy depth computing method may have other variations.

The computation of proxy depth may also be influenced by other factors, including the placement of 3D subtiles in a motion picture presentation. A 3D subtitle may be superimposed at the lower portion of images, but it may also be placed at the other portion of images. In addition, subtitles can also be placed outside the image frame, such as placed below the images. The position of subtitles may be adjusted after proxy depth is calculated. Computing variable proxy depth based on distogram may be based on similar methods described above.

Image Decoding

The computation of proxy depth can include access to a digital form of image content. For a motion picture released in film prints, the computation of proxy depth can be performed prior to film release at a post-production stage. 3D subtitles may be "burnt in" the left-eye and right-eye film prints with appropriate disparity shifts. The 3D subtitles may also be projected onto a screen by a subtitling projection system that produces left and right images of subtitles with appropriate disparity. For a motion picture released in digital format, the subtitles may be superimposed onto images by a digital cinema server or a 3D subtitling apparatus before projected on the screen. Computation of proxy depth can be performed at the post-production stage but it can also be performed on-site in a cinema or even in real-time during film projection. The digital form of a motion picture distributed to a cinema is often in a form of Digital Cinema Package (DCP), which can include each of the elements for a complete theatrical presentation, including digital image files and subtitle files. The image files in a DCP format are normally compressed and encrypted. An electronic key may be used to decrypt the compressed image files which are then uncompressed before projection. The decryption and uncompression can be performed in real-time by a media block apparatus which may be a component in a digital cinema server or in a projection system or in a theater control system. The functions of decryption and uncompression according to some embodiments can be implemented by the image decoding module 314 in FIG. 3.

The compression scheme applied to a DCP may be JPEG2000, or J2K (ISO/IEC 15444-1), which can be performed in wavelet transform domain. J2K is an intra-frame compression method in which the pixel values of each image frame can be represented as coefficients of a multi-level wavelet sub-bands. A sub-band may be a set of wavelet coefficients that represent aspects of the image frame associated with a certain frequency range as well as a spatial area of the image. The wavelet coefficients of each sub-band can be further organized into packets and can be encoded compactly using entropy coding. Each packet may be a contiguous segment of wavelet coefficients representing a specific tile to be transmitted in a specific order as it appears in the code stream. One example of such an order is a Component-Precinct-Resolution-Layer (CPRL) progression order that is specified by DCI. In a CPRL progression order, a packet represents a tile with a specified component, precinct, resolution and layer, as depicted in FIGS. 17A and 17B. For an image frame with a full resolution of 2048×1080 pixels decomposed using a 5-level wavelet, the resulting sub-bands can include a top level (Level 0) sub-band 1702 of size 64×34, Level 1 sub-band 1704 of size 128×68, Level 2 sub-band 1706 of size 256×135, Level 3 sub-band 1708 of size 512×270, Level 4 sub-band 1710 of size 1024×540 and the Level 5 sub-band 1712 of size 2048×1080. These sub-bands are depicted in FIG. 17A. FIG. 17A also shows each level sub-band is divided into at least one precinct. For example, Level 4 sub-band 1710 is divided into 12 precincts. J2K dictates that each precinct is encoded into a single indivisible unit. Since an image frame has three color channels, the resulting J2K bit stream contains 177 packets.

Packets are the key to scalability of J2K compression. A scaled down version of an image frame can be decoded from a relatively smaller number of packets that represent top-level sub-bands. For example, only seven packets are needed to fully recover each color channel of a 512×270 down-scaled version of the image frame 1726 at Level 3. A selective DCP decoding method can be used to decode, at least partially, a down-scaled version of images using the scalability of J2K bit-stream. Sufficient depth information can be extracted from a partially decoded image frame represented by fewer packets in a 3D DCP bit-stream. As a result, the computations for proxy depth can be reduced using selective decoding. The functions of selective decoding can be implemented by the image decoding module 314 in FIG. 3.

One embodiment of the method of selective decoding is further described in FIG. 17B. J2K bit-stream packets representing the top four level (Level 0-3) wavelet sub-bands are depicted. Each of the top three levels of sub-bands can have a single packet for each color channel. As a result, for each individual color channel, a 64×34 image 1720 can be decoded from receiving the first packet 1714. A 128×68 image 1722 can be decoded by adding the next packet 1716, and a larger 256×135 image 1724 can be decoded by receiving one more packet 1718. By only decoding the first three packets (out of a total of 177 packets in the DCP bit-stream of the image frame for example), a down-scaled image of 256×135 resolution may be recovered although with only one color channel. Such a down-scaled image may be sufficient for the estimation of proxy depth. For simplicity, the example depicted in FIG. 17B shows the process for a single color channel, but the same process can be extended to other color channels, if necessary.

More precise proxy depth can be computed by decoding the image at Level 3 with a resolution of 512×270 pixels, which may use additional four Level 3 packets such as packet 3-6 (1728 in FIG. 17B). Based on the CPRL progression order specified by DCI, packet 3, 6, 4, 5 (1728), also shown in FIG. 18, can be packet 3, 10, 45, 52 in the order of the codestream. Each Level 3 packet can represent specific groups of wavelet coefficients with different degrees of importance to depth information. As shown in FIG. 18, the Level 3 can provide three additional sub-bands: HL, LH and HH. The HL sub-band 1808 can contain horizontal discontinuity information (i.e. vertical edges) and can be important for recording depth information. The LH sub-band 1810 can contain horizontal edges and the HH sub-band 1812 can record higher frequency details. In some embodiments, stereo matching can be performed without the LH and the HH sub-band. For example, the wavelet coefficients in the HL sub-band 1808 can be used for the computation of proxy depth to improve computational efficiency further.

An example of encoding Level 3 sub-bands into four packets is shown in FIG. 18. Packet 3 (1814) and packet 6 (1816) represent one portion of the HL sub-band 1808 to promote simplified decoding of Level 3 images by using these two packets in addition to the three packets used for decoding the Level 2 image. In some embodiments, packet 4 (1818) and packet 5 (1820) are omitted by setting the corresponding groups of coefficients to zero. The Level 3 image can be decoded using five packets: packets 0-2 (1802, 1804, 1006), packet 3 (1814) and packet 6 (1816). The result may be a down-scaled image with a resolution of 512×135 pixels, which can be half the height of a full Level 3 image. The LH and HH sub-bands can be discarded in some embodiments to save computation and buffering by, for example, not computing vertical inverse wavelet transform at Level 3.

Decoding of a JPEG2K packet can include two processes: Tier 1 decoding and Tier 2 decoding. Tier 2 decoding can be used to decode the packet header and divide bit stream into code-blocks. Tier 1 decoding may be used to decode each of the code-blocks in the packet. Tier 1 decoding may use more computations than Tier 2 decoding. By not decoding the LH and HH sub-bands, the Tier 1 decoding can be used by the HL sub-band to reduce the computation by approximately ⅔ compared with full decoding of seven packets. As a result, certain embodiments of the selective DCP decoding can reduce computations in the following ways: use the luminance channel, select a sufficient decoding level, decoding selected packets into a down-scaled version of images, and computing proxy depth based on the down-scaled images.

Selection of packets may also depend on the placement of the subtitles on the screen. As shown in FIG. 14A, the screen alignment position of a subtitle element may be fixed globally in the subtitle text file. One common screen alignment position is at the bottom of the screen. For 3D subtitles, however, a fixed position may be problematic under a certain circumstances. For example, for an image scene that has a very close depth near the bottom part of the screen, placing subtitles at the bottom of the screen may be distressful to the audience. In such a case, the subtitles can be located to an alternative screen position to maintain viewing comfort. As discussed previously, the computation of proxy depth can be dependent on screen position of subtitles. For example, in the multiple vertical sampling projection algorithm, used by the image abstraction module, as depicted in FIG. 7, the position of the primary sampling line 706 can be determined by the subtitle screen location. If the subtitle screen position is changed, the subtitle region 704 can be re-allocated and the primary sampling line may also be re-calculated. The resulting left abstract image 712 used for computing the proxy depth of a subtitle element can also be different.

The subtitle depth and the vertical screen position can be recorded in a 3D subtitle file such as the sample file shown in FIG. 14B. The depth of a subtitle element can be described by screen parallax shift ("PShift"), which can split the required amount of horizontal shift equally between the left eye and right eye subtitle images. The parallax shift may be defined in an absolute term by the number of pixels or in a relative term by a percentage of screen width. In addition, the amount of parallax shift for the left and for the right eye may not be equally split. In such a case, the amount of horizontal parallax shifts for the left and right subtitle images may be specified separately in a 3D subtitle file. The sample text file in FIG. 14B may also allow other attributes of a subtitle element to change adaptively according to image content for the purpose of providing more creative choice to the content producers and ultimately enhancing the visual experience of a 3D motion picture. Examples of other attributes include text font style, text font size, and the color of the subtitle text.

In another embodiment, the text font size of a subtitle changes adaptively based on the depth placement of a subtitle element. One purpose for adaptively changing font size can include maintaining a consistent subtitle size as perceived by a viewer. The perceived size of an object in stereoscopic 3D images is affected by the depth placement of the object. For example, a 3D object appears smaller as it moves closer to a viewer even though its actual size does not change. This can be referred to as miniaturizing, which may result from size-distance laws that govern stereoscopic vision. Reverse miniaturizing can also occur when an object appears bigger when it moves away from a viewer. The miniaturizing effect can also apply to the perceived size of a 3D subtitle element. As a result, a subtitle text can appear smaller when it is placed closer to a viewer than it is away from a viewer, which may or may not be acceptable. In some embodiments, the font size of subtitles is adaptively scaled to pre-compensate the effect of miniaturizing so that the perceived size of the subtitles is consistent throughout the entire motion picture. The size scaling factor for pre-compensation can be calculated based on the estimated level of miniaturization by applying size-distance laws.

In another embodiment, the style and/or color of subtitle text font changes adaptively based on image content. One purpose for adaptively changing font style and/or font color can include providing more creative choice to the content producers and ultimately enhancing the visual experience of a 3D motion picture. Another purpose for changing subtitle text color can include enhancing readability to avoid subtitle text blending into the background images with a similar color range. Another purpose for changing subtitle font style and color can include expressing certain mood from the speaking or the narrator.

The content adaptive attributes of 3D subtitles can be recorded in a 3D subtitle file such as the example shown in FIG. 14B. The example file shows new information fields that are created for the recording of font size information ("Size"), the font style information ("FontID" and "Weight") and font color information ("Color"). These information fields can be set differently for each subtitle element.

Exemplary Display Implementations

Various systems and methods can be used to display 3D images with content adaptive 3D subtitles using one or more render attributes computed for subtitle elements. Examples of systems that can be used for such displays include an offline display system and a real-time display system. In an offline display system, subtitle render attributes are computed at a first point in time and saved in a data file such as a subtitle file or metadata. At a later second point in time, the saved render attributes are used by a cinema server or other display server in communication with a display device to display the subtitle elements with the 3D image sequence. An example of a display device is a projector.

The computation of content adaptive subtitle attributes for an offline display system can be part of a post-production process of a 3D motion picture. The resulting subtitle depth information and other attributes can be delivered to a 3D projection system in a Digital Cinema Package (DCP) format. A DCP format is a digital representation of a motion picture to be distributed to digital cinemas. A DCP format contains track files that represent image data, audio data, subtitle data, metadata or other data. These track files are encrypted for distribution security. The methods and the technical specification for DCP file packaging are described in certain standardization documents including Digital Cinema System Specification (Version 1.2) published by Digital Cinema Initiatives, LLC, as well as in a number of standardization documents that are currently in development by SMPTE (Society of Motion Picture and Television Engineers).

In a real-time display system, the render attributes can be determined in real-time, or at least near real-time, with the display of subtitles using the render attributes with a 3D image sequence. For example, the system can receive an encoded or unencoded 3D image sequence, and a subtitle file. The system can determine render attributes and configure the 3D image sequence and subtitles for display, by a projector for example, using the render attributes.

FIG. 19 depicts a functional block diagram of an offline display system according to one embodiment of the present invention. The system can be used to compute 3D subtitling render attributes and can be implemented at least in part as a software module or software modules with an offline post-production process. For example, certain modules are depicted in FIG. 19 that may be implemented as executable code stored on a computer-readable medium, or as a hardware configuration.

The system can include a server device 1900 that can receive a 3D image sequence 1906 and 3D subtitle files/metadata 1908. The 3D subtitle files/metadata can include render attributes, in addition to other information such as timing information, subtitle text, timing in and out, vertical position, horizontal position, depth or displacement, text fonts and language direction (from let to right, right to left, etc.). The 3D subtitle files/metadata 1908 can be stored on a storage media before being provided to the server device 1900. The 3D image sequence 1906 may be a DCP package that includes track files to be distributed to cinemas. In some embodiments, the 3D subtitle files/metadata 1908 is distributed with the 3D image sequence 1906 to the server device 1900. In other embodiments, the 3D subtitle files/metadata 1908 is distributed to the server device 1900 separate from the 3D image sequence 1906.

The server device 1900 may be a processor-based device that can execute code stored on a computer-readable medium. It can include a processor and the computer-readable medium that can tangibly embody executable code. The server device 1900 may be a cinema server that is capable of superimposing subtitles onto the 3D image sequence using the render attributes. In some embodiments, the server device 1900 receives the 3D image sequence 1906 and the 3D subtitle files/metadata 1908 over a network, such as the Internet or an intranet. In other embodiments, the 3D image sequence 1906 and the 3D subtitle files/metadata 1908 are stored on a portable storage device, such as an optical storage device or a semiconductor storage device, that is received physically by the server device 1900.

The server device 1900 can include a subtitle controller 1910 that uses the information, such as render attributes and subtitle, from the 3D subtitle files/metadata 1908 to control a subtitle rendering module 1912. The subtitle rendering module 1912 is capable of rendering subtitles using render attributes and superimposing the subtitles onto a 3D image sequence. For example, the subtitle controller 1910 can generate control commands based on the 3D subtitle files/metadata and provide the control commands to the subtitle rendering module 1912. The control commands can include commands to produce subtitle text images at the right times and at correct screen positions for each subtitle element. Those commands can be triggered by the current show running time from image decoder 1914. Following each command from the subtitle controller 1910, the subtitle rendering module 1912 can produce subtitle text images with correct fonts and combine subtitle images with left and right images at correct positions and displacement synchronized with current left and right eye images.

The 3D image sequence 1906 may be in an encoded format and can be received by an image decoder 1914 to decrypt the 3D image sequence 1906 before it is received by the subtitle rendering module 1912. In other embodiments, the 3D image sequence 1906 is in an unencoded format that is provided to the subtitle rendering module 1912 without being decoded by the image decoder 1914. For example, the 3D image sequence 1906 may be decoded before being received by the server device 1900. The subtitle rendering module 1912 can superimpose the subtitle elements onto the 3D image sequence based on the render attributes.

The 3D image sequence with the subtitle superimposed on the 3D image sequence using the render attributes is provided from the server device 1900 to a display device 1916. The display device 1916 is capable of displaying the 3D image sequence with the 3D subtitle to an audience. Examples of display device 1916 include a cinematic projector, a liquid crystal display device, a plasma display device, or other high definition display device.

FIG. 20 depicts a functional block flow diagram of an onsite processing system that is a real-time display system located at a theatre site, for example. A 3D image sequence 2002 and a subtitle file 2006 are received at the theatre site. The 3D image sequence 2002 may be received with the subtitle file 2006, or separate from the subtitle file 2006. The subtitle file 2006 can include subtitle information such as subtitle text and timing information.

A server device 2000 can be located at the theatre site. The server device 2000 may be a processor-based device that can execute code stored on a computer-readable medium. It can include a processor and the computer-readable medium that can tangibly embody executable code. The server device 2000 can include an image decoder 2004 stored on a computer-readable medium. The image decoder 2004 can decode the 3D image sequence 2002, if needed, into an unencrypted and uncompressed format. In some embodiments, the server device 2000 does not include an image decoder 2004, or the image decoder 2004 does not decode the 3D image sequence 2002. For example, the 3D image sequence 2002 may be in an unencrypted and uncompressed format, or an image decoding module 314 may be included in the computing device 302 that is in the server device 2000. The computing device 302 can receive the 3D image sequence 2002 and the subtitle file 2006 and perform functions, as described, for example, with respect to FIG. 3 in real-time, to output render attributes 2008. The render attributes can be used by a subtitle rendering module 2010, which can receive the 3D image sequence 2002 or an unencrypted 3D image sequence, to render subtitle text images and superimpose the subtitles onto the 3D image sequence 2002. The output of the subtitle rendering module 2010 can be provided to a display device 2012. The display device 2012, which may be a projector, can be capable of displaying the subtitles superimposed onto the 3D image sequence 2002 to a viewing audience.

In some embodiments, the computing device 302 includes a subtitle controller that can output control commands to the subtitle rendering module 2010 to cause the subtitle rendering module 2010 to render and superimpose the subtitles onto the 3D image sequence correctly. The control commands can include, for example, a command specifying a depth or displacement by which the subtitle is to be rendered, along with timing information for associated with the depth and the subtitle element.

Certain particular functions of embodiments of subtitling controllers are dependent on the characteristics of the input and the output device. For example, if the depth information is computed offline and distributed through a DCP, the input to the subtitling controller can be the decoded track files such as 3D subtitle files or metadata with a pre-determined text file format. The subtitling controller can interpret the text files and retrieve the depth information along with other subtitle information. In another embodiment, if the depth information is delivered through a separate channel, the input data files may or may have a text file format and the subtitling controller can interpret the input depth information in a different way. In another embodiment, if the subtitle depth information is computed in real-time from DCP, the depth information may be directly available to the subtitling controller while the other subtitle information may be retrieved from the regular subtitle files.

FIG. 21 shows a method that can be performed by a subtitling controller that receives DCP track files as input and outputs instructions that control content adaptive depth to a subtitle rendering module according to one embodiment. The first step in FIG. 21 is to receive a DCP track file from the DCP Decoder 2102. The subtitling controller can then search the track file for the first subtitle element and retrieve the depth information 2106. The depth information may be in a range from a few feet from audience to infinity, or it can be described by equivalent pixel disparity. It is possible that the output device, the subtitle rendering module, may have a limited depth range and a fixed number of permitted depth steps. For instance, a subtitle rendering module may be capable of outputting a depth in a range from 10 feet to 100 feet, with a limited number of permitted depth steps. In such a case, the subtitling controller can map the subtitle depth value to one of the closest permitted depth steps stored in memory device of the controller. Such a process is described in FIG. 21 as depth quantization 2108. The subtitling controller can also retrieve the timing information from the track file in order to issue an instruction to the output device, the subtitle rendering module, with the right timing so that the displayed subtitle text can be in synchronization with images and audio track and also without jumping when it is showing on screen 2110. Depending on the implementation, a certain amount of time may be needed from when the instruction is issued by the subtitling controller until the subtitle rendering module executes it. The subtitle rendering module may be capable of executing an instruction at a certain time of interval. To maintain subtitle synchronization with audio and images, the delays and intervals can determine the triggering time of the instruction to avoid synchronization errors. Such a process can be timing quantization 2112.

The system can search for other information associated with the current subtitle element 2114. With depth and the timing determined, along with the other associated information, the subtitling controller generates an instruction 2116 to the subtitle rendering module 2122 to produce 3D subtitle images at the correct time and with correct depth, fonts and screen positions. The subtitling controller repeats the above steps for each subtitle element listed in the DCP track files 2118, 2120.

In some embodiments, the workflow of the subtitling controller of FIG. 21 can be expanded to control other content adaptive subtitle attributes. The subtitling controller can then search and retrieve each of the relevant subtitle attributes from a track file, perform necessary functions to map these subtitle attributes values to appropriate instructions compatible with the hardware and software limitations of a subtitle rendering module.

The foregoing is provided for purposes of illustrating, explaining, and describing embodiments of the present invention. Further modifications and adaptations to these embodiments will be apparent to those skilled in the art and may be made without departing from the scope or spirit of the invention.

What is claimed is:

1. A method comprising:
    receiving a three-dimensional (3D) image sequence;
    receiving a subtitle file for the 3D image sequence, the subtitle file comprising a subtitle element and timing information associated with the subtitle element;
    associating the subtitle element with a segment of image frames of a temporal duration of the 3D image sequence, wherein associating the subtitle element with the segment of the 3D image sequence is based on the timing information;
    generating a right-eye abstract image from the segment and generating a left-eye abstract image from the segment, the right-eye abstract image representing multiple right-eye images of the segment, the left-eye abstract image representing multiple left-eye images of the segment;
    computing, by a computing device, an abstract depth map from the right-eye abstract image and the left-eye abstract image, the computing device comprising a processor capable of causing the computing device to compute the abstract depth map;
    computing, by the computing device, a proxy depth based on the abstract depth map for the subtitle element;
    using the proxy depth to determine a render attribute for the subtitle element; and
    outputting the render attribute.

2. The method of claim 1, wherein computing, by the computing device, the abstract depth map from the right-eye abstract image and the left-eye abstract image comprises computing the abstract depth map from an abstract image pair that is generated using vertical sampling projection, wherein the abstract image pair comprises the left-eye abstract image generated from a left-eye image sequence and the right-eye abstract image generated from a right-eye image sequence.

3. The method of claim 2, wherein vertical sampling projection comprises:
    selecting a sampling line in the 3D image sequence; and
    creating a new pixel by projecting at least one pixel of a vertical column of image pixels to a point on the sampling line, wherein the new pixel comprises a value determined by a selected projection function.

4. The method of claim 2, wherein computing the abstract depth map from the abstract image pair comprises estimating horizontal pixel disparity.

5. The method of claim 1, wherein computing, by the computing device, the proxy depth based on the abstract depth map for the subtitle element comprises:
    determining the proxy depth based on a temporal and statistical distribution of pixel disparity from the abstract depth map.

6. The method of claim 1, wherein the proxy depth is constant for a duration of the subtitle element.

7. The method of claim 1, wherein the proxy depth varies for a duration of the subtitle element.

8. The method of claim 1, further comprising:
    changing at least one of a text font size or a text font color of the subtitle element based on content of the 3D image sequence.

9. The method of claim 1, further comprising:
    identifying a change in depth between adjacent subtitle elements has a value greater than a pre-set threshold; and
    modifying depth values in response to the identifying.

10. The method of claim 1, wherein the render attribute comprises at least one of:
    a depth for the subtitle element;
    a color for the subtitle element;
    a font style for the subtitle element;
    a font size for the subtitle element; or
    a screen position for the subtitle element.

11. The method of claim 10, wherein the render attribute is the color for the subtitle element, wherein the color is modified based on content of the 3D image sequence to distinguish the subtitle element from the content of the 3D image sequence.

12. The method of claim 1, wherein the proxy depth comprises a disparity value that is larger than a maximum disparity of at least part of content of the 3D image sequence with which the subtitle element is to be displayed.

13. The method of claim 1, wherein the 3D image sequence is an encoded 3D image sequence.

14. The method of claim 13, further comprising: decoding the encoded 3D image sequence to compute the proxy depth.

15. The method of claim 13, wherein the encoded 3D image sequence is one of a Digital Cinema Package (DCP) format or a video format.

16. The method of claim 15, wherein the encoded 3D image sequence is a DCP formatted 3D image sequence that is at least partially decoded using a portion of packets in JPEG-based encoding information to compute the proxy depth.

17. The method of claim 1, further comprising:
storing the render attribute as a 3D subtitle file; and
providing the 3D subtitle file separate from the 3D image sequence.

18. The method of claim 1, further comprising:
storing the render attribute and the 3D image sequence in one data file package;
and providing the data file package.

19. A system comprising:
a computing device comprising (i) a non-transitory computer-readable medium having modules stored thereon and (ii) a processor capable of executing modules stored on the computer-readable medium, the modules being executable by the processor to cause the computing device to perform actions, the modules comprising:
a temporal window selection module configured to associate a subtitle element with a segment of image frames of a temporal duration of a 3D image sequence based on timing information, the subtitle element being associated with the timing information;
an abstract depth computing module configured to compute an abstract depth map from the segment associated with the subtitle element by generating a right-eye abstract image from the segment, generating a left-eye abstract image from the segment, and computing the abstract depth map from the right-eye abstract image and the left-eye abstract image, the right-eye abstract image representing multiple right-eye images of the segment, the left-eye abstract image representing multiple left-eye images of the segment;
a proxy depth decision module configured to compute a proxy depth based on the abstract depth map for the subtitle element; and
a render attribute computing module configure to use the proxy depth map to determine a render attribute for the subtitle element.

20. The system of claim 19, wherein the abstract depth computing module is configured to compute the abstract depth map from the segment associated with the subtitle element by computing the abstract depth map from an abstract image pair using vertical sampling projection, wherein the abstract image pair comprises the left-eye abstract image generated from a left-eye image sequence and the right-eye abstract image generated from a right-eye image sequence.

21. The system of claim 19, further comprising:
a server device in communication with the computing device, the server device being configured to render the subtitle element with the 3D image sequence using the render attribute for the subtitle element; and
a display device in communication with the server device, the display device being configured to display the subtitle element using the render attribute and to display the subtitle element with the 3D image sequence.

22. The system of claim 21, wherein the server device comprises the computing device.

23. The system of claim 21, wherein the server device comprises an image decoder configured to decode the 3D image sequence before rendering the subtitle element with the 3D image sequence.

24. The system of claim 21, wherein the computing device is configured to store the render attribute as a 3D subtitle file or as a metadata, wherein the server device comprises a subtitle controller that is configured to generate a control command from the render attribute stored as the 3D subtitle file or as metadata, the control command being used by a subtitle rendering module to superimpose the subtitle element onto the 3D image sequence.

25. The system of claim 19, wherein the 3D image sequence is in an encoded format, wherein the modules further comprise:
an image decoding module configured to decode the 3D image sequence in the encoded format.

26. The system of claim 19, wherein the render attribute comprises at least one of:
a depth for the subtitle element;
a color for the subtitle element;
a font style for the subtitle element;
a font size for the subtitle element; or
a screen position for the subtitle element.

27. A computer-program product comprising program code stored on a non-transitory computer-readable medium, the program code being executable by a processor to cause a computer to perform actions, the program code comprising:
program code for associating a subtitle element with a segment of image frames of a temporal duration of a 3D image sequence based on timing information for the subtitle element;
program code for computing a render attribute for the subtitle element based on a depth of at least part of content in the segment of the 3D image sequence associated with the subtitle element by generating a right-eye abstract image from the segment, generating a left-eye abstract image from the segment, computing an abstract depth map from the right-eye abstract image and the left-eye abstract image, and computing the render attribute using a proxy depth computed from the abstract depth map, wherein the right-eye abstract image represents multiple right-eye images of the segment and the left-eye abstract image represents multiple left-eye images of the segment; and
program code for outputting the render attribute.

28. The computer-program product of claim 27, further comprising:
program code for rendering the subtitle element with the 3D image sequence using the render attribute for the subtitle element.

29. The computer-program product of claim 28, wherein program code for rendering the subtitle element with the 3D image sequence using the render attribute for the subtitle element comprises:
program code for superimposing the subtitle element on the 3D image sequence at an apparent depth in accordance with the render attribute.

30. The computer-program product of claim 27, further comprising:

program code for providing a control command based on the render attribute for the subtitle element; and program code for, responsive to receiving the control command, rendering the subtitle element with the 3D image sequence.

31. The computer-program product of claim 27, wherein the render attribute comprises at least one of:
a depth for the subtitle element;
a color for the subtitle element;
a font style for the subtitle element;
a font size for the subtitle element; or
a screen position for the subtitle element.

32. The method of claim 1, wherein generating the right-eye abstract image includes generating a single right-eye abstract image,
wherein generating the left-eye abstract image includes generating a single left-eye abstract image,
wherein the right-eye abstract image and the left-eye abstract image represent movement of an object with respect to a foreground in all images of the segment.

33. The method of claim 1, wherein the generating the right-eye abstract image and generating the left-eye abstract image include generating the right-eye abstract image and the left-eye abstract image that represent movement of an object with respect to a foreground in the multiple images of the segment.

34. The method of claim 33, wherein the abstract depth map includes changes of depth of the object with respect to the foreground in the multiple images of the segment.

\* \* \* \* \*